United States Patent
Nishikata et al.

(10) Patent No.: US 8,335,016 B2
(45) Date of Patent: Dec. 18, 2012

(54) IMAGE PROCESSING APPARATUS AND PROGRAM PRODUCT USING INDEX VALE OR PRESENTATION IMAGE TO DECIDE CONSUMPTION OF RECORDING MATERIAL

(75) Inventors: Takumi Nishikata, Saitama (JP); Kouji Yorimoto, Saitama (JP); Yasuo Komatsu, Saitama (JP); Kiyoshi Une, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 479 days.

(21) Appl. No.: 12/754,849

(22) Filed: Apr. 6, 2010

(65) Prior Publication Data
US 2011/0032548 A1 Feb. 10, 2011

(30) Foreign Application Priority Data
Aug. 10, 2009 (JP) ................................. 2009-185743

(51) Int. Cl.
 *H04N 1/40* (2006.01)
 *H04N 1/407* (2006.01)
(52) U.S. Cl. ........................... 358/1.9; 358/3.24; 399/27
(58) Field of Classification Search .................. 358/1.9, 358/2.1, 3.06, 3.21, 3.24, 3.26, 1.13–1.15, 358/504, 406, 468, 296, 300; 399/9, 24, 399/27; 347/14, 19, 112
See application file for complete search history.

(56) References Cited

U.S. PATENT DOCUMENTS

| | | | | |
|---|---|---|---|---|
| 7,061,391 B2* | 6/2006 | Hopper et al. | .................. | 399/24 |
| 7,280,258 B2* | 10/2007 | Kitahara et al. | ................ | 347/19 |
| 7,283,258 B1* | 10/2007 | Kuno et al. | .................. | 358/1.13 |
| 7,925,173 B2* | 4/2011 | Yamada | .......................... | 399/27 |
| 8,116,643 B2* | 2/2012 | Nagai | .............................. | 399/27 |
| 2003/0020951 A1* | 1/2003 | Minowa et al. | .............. | 358/1.15 |
| 2004/0036897 A1* | 2/2004 | Yamauchi | ..................... | 358/1.9 |
| 2007/0292156 A1* | 12/2007 | Eguchi | ............................ | 399/45 |
| 2011/0032548 A1* | 2/2011 | Nishikata et al. | .............. | 358/1.9 |
| 2011/0032549 A1* | 2/2011 | Komatsu et al. | .............. | 358/1.9 |
| 2011/0051156 A1* | 3/2011 | Yorimoto et al. | ............. | 358/1.9 |
| 2011/0170142 A1* | 7/2011 | Ito et al. | ........................ | 358/3.24 |
| 2012/0050766 A1* | 3/2012 | Saiki | .............................. | 358/1.9 |

FOREIGN PATENT DOCUMENTS
JP  A-2007-019727  1/2007

* cited by examiner

*Primary Examiner* — Scott A Rogers
(74) *Attorney, Agent, or Firm* — Oliff & Berridge, PLC

(57) ABSTRACT

An image processing apparatus includes a storing unit that stores an image forming information including an image type information indicative of a type of an image for each image, an index value to be a decision source related to a suppression in a consumption of a recording material, and a print setting information; a discriminating unit that discriminates a type of an image to be an image forming target; a calculating unit that calculates the index value; and a selecting unit that selects any of the image forming information which is stored in the storing unit and takes top priority based on a result of the discrimination obtained by the discriminating unit and a result of the calculation obtained by the calculating unit.

9 Claims, 23 Drawing Sheets

FIG. 2

DATA STRUCTURE OF IMAGE FORMATION INFORMATION (PRESET)

| |
|---|
| PRESET NAME |
| REDUCED IMAGE |
| IMAGE TYPE |
| RGB IMAGE DENSITY |
| RGB HISTOGRAM |
| CMYK IMAGE DENSITY IN DEFAULT SETTING APPLICATION |
| CMYK IMAGE DENSITY IN PRINT SETTING APPLICATION |
| CMYK HISTOGRAM IN PRINT SETTING APPLICATION |
| PRINT SETTING INFORMATION |

…

IMAGE PROCESSING APPARATUS AND PROGRAM PRODUCT USING INDEX VALE OR PRESENTATION IMAGE TO DECIDE CONSUMPTION OF RECORDING MATERIAL

CROSS-REFERENCE TO RELATED APPLICATION

This application is based on and claims priority under 35 USC 119 from Japanese Patent Application No. 2009-185743 filed on Aug. 10, 2010.

BACKGROUND

Technical Field

The present invention relates to an image processing apparatus and a computer readable medium.

SUMMARY

According to an aspect of the invention, an image processing apparatus includes a storing unit that stores an image forming information including an image type information indicative of a type of an image for each image, an index value to be a decision source related to a suppression in a consumption of a recording material, and a print setting information; a discriminating unit that discriminates a type of an image to be an image forming target; a calculating unit that calculates the index value; and a selecting unit that selects any of the image forming information which is stored in the storing unit and takes top priority based on a result of the discrimination obtained by the discriminating unit and a result of the calculation obtained by the calculating unit.

BRIEF DESCRIPTION OF THE DRAWINGS

Exemplary embodiments of the invention will be described in detail based on the following figures, wherein:

FIG. 2 is a diagram showing an example of a data structure of image forming information (preset) according to the first exemplary embodiment.

DETAILED DESCRIPTION

Figure 1:
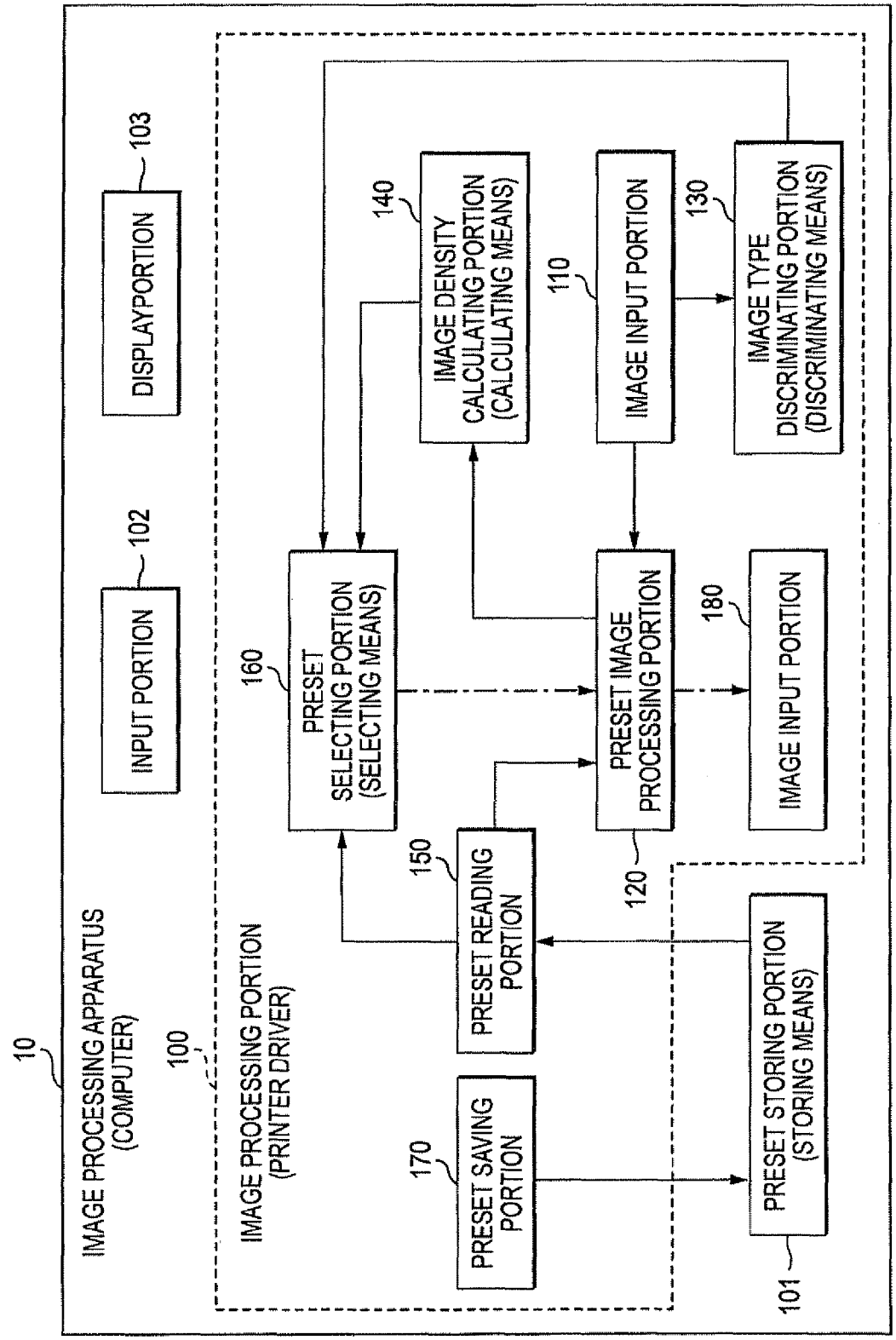
FIG. 1 is a block diagram showing a function of an image processing apparatus according to a first exemplary embodiment.

An exemplary embodiment to be an example of the invention will be described below in detail with reference to the drawings. In the drawings for explaining the exemplary embodiment, the same components have the same reference numerals in principle and repetitive description thereof will be omitted.

First Exemplary Embodiment

An image processing apparatus according to a first exemplary embodiment will be described.

An image processing apparatus 10 is a computer, for example, and has an image processing portion 100, a preset storing portion 101, an input portion 102 and a display portion 103 as shown in FIG. 1.

The preset storing portion 101 has a function of storing means (storing unit) and stores image forming information including image type information indicative of a type of an image every image, an index value to be a decision source related to a suppression in a consumption of a recording material, and print setting information.

An image has three types of a character, a character photograph and a photograph, and the image type information indicates any of the three types. The character photograph includes the character and the photograph.

The index value to be the decision source related to the suppression in the consumption of the recording material includes an image density related to an image for each color of a predetermined color space which is concerned with an image to be an image forming target, a consumption rate of the recording material which is concerned with the image to be the image forming target, a histogram related to an image for each color of the predetermined color space which is concerned with the image to be the image forming target, and a reduced image which is concerned with the image to be the image forming target, for example.

The image density includes an image density (hereinafter referred to as an "RGB image density") related to an image for each color in a color space (hereinafter referred to as an "RGB color space") represented by each of colors of red (R), green (G) and blue (B) (hereinafter referred to as "RGB colors"), and an image density (hereinafter referred to as a "CMYK image density") related to an image for each color of a color space (hereinafter referred to as a "CMYK color space") represented by each of colors of cyan (C), magenta (M), yellow (Y) and black (K) (hereinafter referred to as "CMYK colors").

A toner consumption rate (%) indicates a value obtained by calculating {(a CMYK image density related to an image applying a print set value/a CMYK image density related to an image applying a default set value concerned with printing)×100}.

A default set value related to the printing indicates a preset value offered by the image processing apparatus 10, that is, a system in relation to print setting information which will be described below (a default set value=an initial set value). In the specification of the application, the default set value related to the printing is defined to be "default print setting information".

The print set value indicates a set value obtained after changing the default print setting information (the default set value related to the printing) by a user. The print set value indicates the print setting information included in the image forming information.

The print setting information includes a size of a paper to be a recording medium, for example, a color mode (a monochrome or a color), the number of output copies, a direction of the paper, and broadside or perfecting.

The default print setting information (the default set value related to the printing) is stored in a different storage area from a storage area for storing a preset in the preset storing portion 101.

The histogram includes a histogram related to an image for each color of the RGB color space (which will be hereinafter referred to as an "RGB histogram").

In the specification of the application, information about at least one of the image density (the RGB image density or the CMYK image density) to be the index value, the histogram (the RGB histogram) and the reduced image in the image density, the consumption rate of the recording material, the histogram and the reduced image is stored in the preset storing portion 101, and the consumption rate of the recording material is calculated based on the CMYK image density, and therefore, is not stored in the preset storing portion 101. As a matter of course, the consumption rate of the recording material may also be stored in the preset storing portion 101.

In the first exemplary embodiment, the image density related to the image for each color of the color space, for example, the RGB image density is stored as the index value in a preset storing portion 101.

The image forming information including the image type information, the index value and the print setting information implies prestored (preset) information. For this reason, in the specification of the application, the image forming information is defined to be a "preset".

In other words, the image type information, the RGB image density to be the index value and the print setting information are stored as the preset for each image in the preset storing portion 101.

The image processing portion 100 has the image input portion 110, a preset image processing portion 120, an image type discriminating portion 130, an image density calculating portion 140, a preset reading portion 150, a preset selecting portion 160, a preset saving portion 170 and an image output portion 180.

The image input portion 110 serves to carry out a processing for inputting an image to be an image forming target (which will be hereinafter referred to as a "print image"), for example, a processing for acquiring image data created based on an application, a processing for reading image data stored in a storing medium such as a storage device or removable media or a processing for accepting image data transmitted from a computer or a server through a communication line.

Thus, the print image input by the image input portion 110, for example, an RGB print image is given to the preset image processing portion 120 and the image type discriminating portion 130.

The preset image processing portion 120 generates output plane information (a bit mask) for each of the R, G and B colors based on the R, G and B print images received from the image input portion 110. The output plane information about each of the R, G and B colors is given to the image density calculating portion 140.

Moreover, the preset image processing portion 120 outputs the print image received from the image input portion 110 and the print setting information included in a specific preset which is transferred from the preset selecting portion 160 as a print job to the image output portion 180.

The image type discriminating portion 130 has a function of discriminating means (discriminating unit), and calculates a rate of graphics (graphics in a wide sense) and an image in a print image (an image to be an image forming target) and discriminates a type of the print image based on a result of the calculation. In the specification of the application, it is assumed that the graphics (the graphics in the wide sense) include at least one of elements, that is, graphics in a narrow sense (figures) and a character.

The image density calculating portion 140 has a function of calculating means (calculating unit) and serves to calculate the index value, and calculates an image density related to an image for each color of a predetermined color space which is concerned with a print image. In the first exemplary embodiment, the image density calculating portion 140 calculates the RGB image density (an image density related to an image for each color of the RGB color space).

More specifically, the image density calculating portion 140 calculates the RGB image density based on the output plane information for each of the R, G and B colors received from the preset image processing portion 120.

Referring to an image (RGB image) A represented by the R, G and B colors of the RGB color space, the image density calculating portion 140 calculates the following Equation 1 to obtain the RGB image density, wherein an image density related to the image A having the R color is represented by Ra, an image density related to the image A having the G color is represented by Ga and an image density related to the image A having the B color is represented by Ba. An image size of the RGB image A has a width and a height in transverse and longitudinal directions, respectively.

$$Ra = \sum_{x=0}^{width-1} \sum_{y=0}^{height-1} P_R(x, y)$$

$$Ga = \sum_{x=0}^{width-1} \sum_{y=0}^{height-1} P_G(x, y)$$

$$Ba = \sum_{x=0}^{width-1} \sum_{y=0}^{height-1} P_B(x, y)$$

[Equation 1]

$P_R(x, y)$ indicates a value of the R color of a pixel having coordinates (x, y) of the image A, $P_G(x, y)$ indicates a value of the G color of a pixel having coordinates (x, y) of the image A, and $P_B(x, y)$ indicates a value of the B color of a pixel having coordinates (x, y) of the image A.

The preset reading portion 150 reads the presets (all of the presets) from the preset storing portion 101.

The preset selecting portion 160 has a function of selecting means (selecting unit) and selects any of all the presets which is read by the preset reading portion 150 (the image forming information stored in the preset storing portion 101) and takes top priority based on a result of the discrimination which is obtained by the image type discriminating portion 130 and a result of the calculation which is obtained by the image density calculating portion 140.

More specifically, the preset selecting portion 160 selects, from all of the presets, a preset including image type information indicative of a type of an image which is discriminated by the image type discriminating portion 130 and an image density having the smallest value of a difference from the image density calculated by the image density calculating portion 140.

Moreover, the preset selecting portion 160 outputs the specific preset selected as described above to the preset image processing portion 120.

The preset saving portion 170 saves, as a novel preset in the preset storing portion 101, the image type information, the index value and the print setting information which are related to the print image when a value of a difference between the image density to be the index value included in the specific preset which is selected by the preset selecting portion 160 and the image density related to the print image which is calculated by the image density calculating portion 140 exceeds a threshold. When the value of the difference is equal to or smaller than the threshold, the novel preset corresponding to the print image is not saved in the preset storing portion 101.

The image output portion 180 outputs the print job received from the preset image processing portion 120 toward a printer which is not shown.

The input portion 102 is an input device, for example, and inputs information such as an instruction for carrying out print setting or printing, or a selection of options.

The display portion 103 is a display device, for example, and displays display information such as a print dialog (property) offered by an application or a print setting property offered by the image processing portion 100.

In the specification of the application, the image processing portion 100 is supposed to be a printer driver. However, the image processing portion 100 is not restricted to the printer driver but may be constituted by dedicated software, firmware or hardware.

Next, FIG. 2 shows an example of a data structure of the image forming information (preset).

The image forming information, that is, the preset has the data structure having at least image type information, an index value and print setting information in a preset name, a reduced image, an image type, an RGB image density, an RGB histogram, a CMYK image density in a default setting application, a CMYK image density in a print setting application, a CMYK histogram in the print setting application, and the print setting information.

The preset name indicates a name given to the preset, that is, a name given to the preset by a system (the image processing portion 100) or a user.

The reduced image indicates an image obtained by reducing a print image, for example, an image for presentation which is presented (displayed) corresponding to the preset name.

The CMYK image density in the default setting application indicates a CMYK image density related to an image subjected to an image processing based on the default print setting information (a default set value related to printing).

The CMYK image density in the print setting application indicates a CMYK image density related to an image subjected to the image processing based on the print setting information.

The CMYK histogram in the print setting application indicates a CMYK histogram related to an image subjected to the image processing based on the print setting information.

The image type, the RGB image density, the RGB histogram and the print setting information have the contents described above.

In the specification of the application, there is employed, as the index value, at least one of the information about the reduced image, the RGB image density, the RGB histogram, the CMYK image density in the default setting application, the CMYK image density in the print setting application and the CMYK histogram in the print setting application which are included in the preset or the toner consumption rate obtained based on the CMYK image density in the print setting application and the CMYK histogram in the print setting application. As a matter of course, the at least one information in the preset and the toner consumption rate may be employed as the index value.

Next, a preset selection processing of the image processing apparatus 10 will be described with reference to FIG. 3.

In the example, it is assumed that the preset stored in the preset storing portion 101 includes at least the image type information, the RGB image density and the print setting information for each image.

A user operates the input portion 102 in a state in which an application that is being operated and started by the image processing apparatus 10 is displayed on the display portion 103, and gives a print command from the application, and presses down an "OK" button in a print dialog offered by the application and displayed on the display portion 103.

When the "OK" button in the print dialog is pressed down, the image processing portion 100 serving as the printer driver is started. In the image processing portion 100 thus started, the preset reading portion 150 reads all of the presets from the preset storing portion 101.

Moreover, the image input portion 110 reads print image data to be a printing target image (RGB print image data) from the application (Step S101) and outputs the print image data thus read to the preset image processing portion 120 and the image type discriminating portion 130.

The preset image processing portion 120 generates output plane information (a bit mask) for each of the R, G and B colors based on the RGB print image data received from the image input portion 110. The output plane information for each of the R, G and B colors is given to the image density calculating portion 140.

The image density calculating portion 140 calculates an RGB image density (an image density related to an image for each color of an RGB color space) based on the output plane information for each of the R, G and B colors received from the preset image processing portion 120 (Step S102). In other words, the image density calculating portion 140 calculates the RGB image density in accordance with the Equation 1.

The image type discriminating portion 130 receiving the print image data from the image input portion 110 calculates a rate of graphics in a wide sense and an image in a print image based on the print image data (Step S103), discriminates an image type of the print image based on a result of the calculation (Step S104), and outputs a result of the discrimination to the preset selecting portion 160.

In the decision processing of the Step S104, the image type is determined corresponding to a rate of a region in which the graphics in the wide sense are to be printed and a region in which the image is to be printed. More specifically, it is decided that a "character" is the image type in case of "the region in which the graphics in the wide sense are to be printed>the region in which the image is to be printed", a "character photograph" is the image type in case of "the region in which the graphics in the wide sense are to be printed=the region in which the image is to be printed", and a "photograph" is the image type in case of "the region in which the graphics in the wide sense are to be printed<the region in which the image is to be printed".

In a relationship of "the region in which the graphics in the wide sense are to be printed>the region in which the image is to be printed", it is decided that the image type is the "character" in the case in which the contents of the graphics in the wide sense are contents including a character and graphics in a narrow sense, contents including only the graphics in the narrow sense, or contents including only the character.

The preset selecting portion 160 receiving the result of the discrimination from the image type discriminating portion 130 and the RGB image density from the image density calculating portion 140 selects any of all the presets which is read by the preset reading portion 150 and includes image type information indicative of the type of the image which is discriminated by the image type discriminating portion 130, that is, a preset including the RGB image density having the smallest value of a difference from the RGB image density calculated by the image density calculating portion 140 (Steps S105 to S107).

The details of a way for obtaining the preset including the RGB image density having the smallest value of the difference will be described below.

More specifically, the preset selecting portion 160 selects any of all the presets which is read by the preset reading portion 150 and has image type information indicative of the "character", that is, a preset including the RGB image density having the smallest value of the difference from the RGB image density calculated by the image density calculating portion 140 if the image type transferred from the image type discriminating portion 130 is the "character" (Step S105).

Moreover, the preset selecting portion 160 selects any of all the presets which is read by the preset reading portion 150 and has image type information indicative of the "character photograph", that is, a preset including the RGB image density having the smallest value of the difference from the RGB image density calculated by the image density calculating portion 140 if the image type transferred from the image type discriminating portion 130 is the "character photograph" (Step S106).

Furthermore, the preset selecting portion 160 selects any of all the presets which is read by the preset reading portion 150 and has image type information indicative of the "photograph", that is, a preset including the RGB image density having the smallest value of the difference from the RGB image density calculated by the image density calculating portion 140 if the image type transferred from the image type discriminating portion 130 is the "photograph" (Step S107).

Then, the preset selecting portion 160 outputs the specific preset selected as described above to the preset image processing portion 120.

The preset image processing portion 120 outputs, as a print job to the image output portion 180, the print image data which have already been received from the image input portion 110 and print setting information included in the specific preset transferred from the preset selecting portion 160.

The image output portion 180 outputs the print job transferred from the preset image processing portion 120 toward the printer which is not shown, thereby giving a request for printing (Step S108).

If a value of a difference between the RGB image density to be the index value included in the specific preset which is selected by the preset selecting portion 160 and the RGB image density related to the print image calculated by the image density calculating portion 140 exceeds a threshold, the preset saving portion 170 saves the image type information about the print image, the RGB image density to be the index value and the print setting information as a novel preset in the preset storing portion 101.

Next, description will be given to a way for obtaining the preset including the RGB image density (the RGB image density related to an image corresponding to the preset) having the smallest value of the difference from the RGB image density calculated by the image density calculating portion 140 (the RGB image density related to the print image) through the preset selecting portion 160.

The print images (R, G and B images) are represented by images #1, and an image density related to the image having the R color, an image density related to the image having the G color and an image density related to the image having the B color for the images #1 are represented by Ra, Ga and Ba, respectively.

Moreover, the images (the R, G and B images) corresponding to the preset are represented by images #2, and an image density related to the image having the R color, an image density related to the image having the G color and an image density related to the image having the B color for the images #2 are represented by Rb, Gb and Bb, respectively.

On the precondition, a calculation processing is executed in accordance with the following calculating procedures (1) to (3) so that the value of the difference can be obtained.

(1) The preset selecting portion 160 calculates the following equation to obtain a value ΔPCab of a difference between the RGB image density related to the image #1 and the RGB image density related to the image #2.

$$\Delta PCab=\{(Ra-Rb)^2+(Ga-Gb)^2+(Ba-Bb)^2\}^{(1/2)}$$

It results in "the value of the difference between the RGB image density related to the image #1 and the RGB image density related to the image #2 becomes smaller when ΔPCab is decreased". In other words, it results in "the RGB image density related to the image #1 is closer to the RGB image density related to the image #2 when ΔPCab is smaller".

(2) The preset selecting portion 160 obtains a value of a difference between the RGB image density related to the image #1 and the RGB image density related to each of the images #2 corresponding to the presets as described above, and extracts one of the obtained difference values which is the smallest.

(3) The preset selecting portion 160 selects any of all the presets which is read by the preset reading portion 150 and includes an image from which the extracted difference value is obtained.

Next, a hardware structure of the image processing apparatus 10 will be described with reference to FIG. 4.

Figure 4:
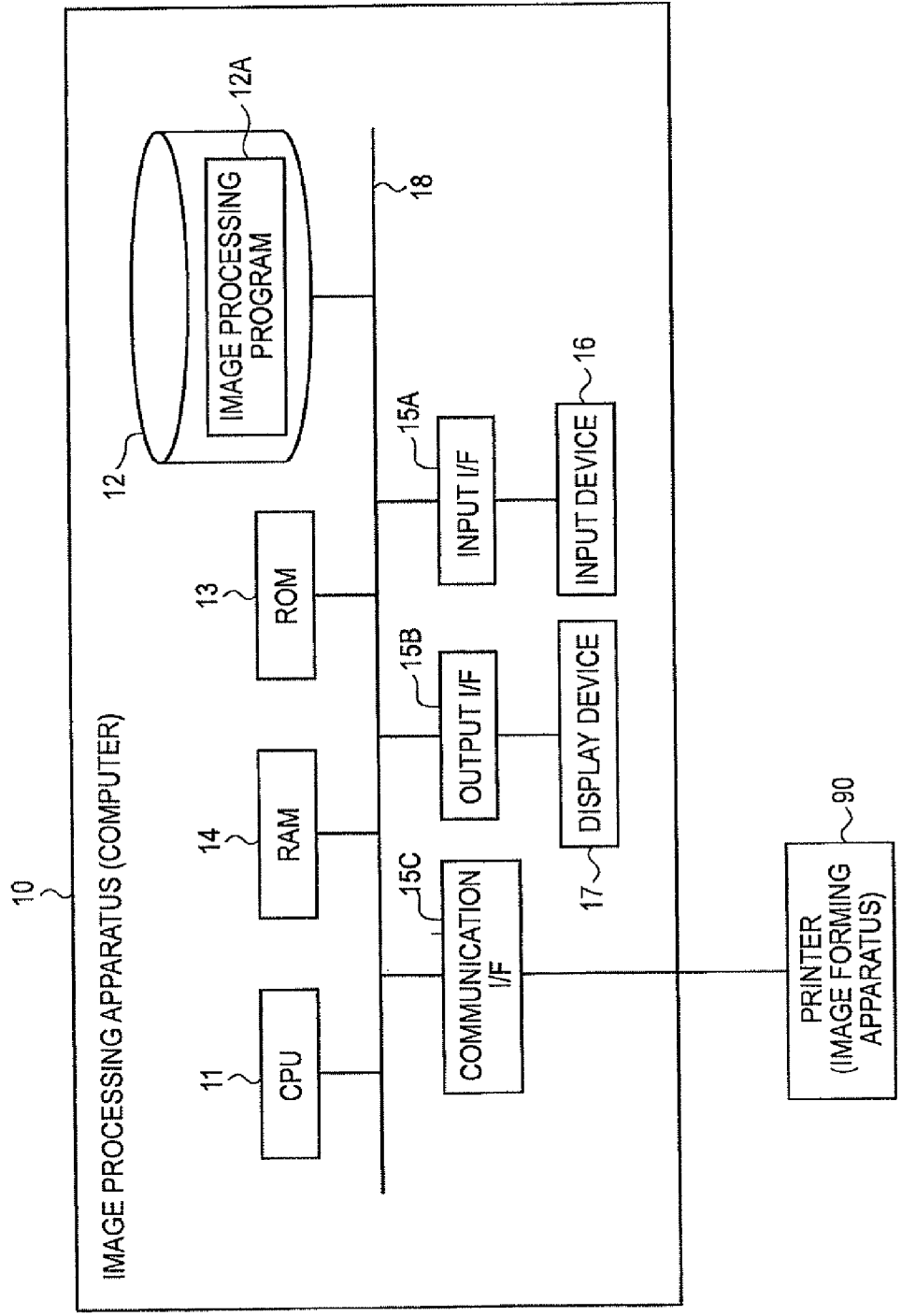
FIG. 4 is a diagram showing a hardware structure of the image processing apparatus according to the first exemplary embodiment.

As shown in FIG. 4, the image processing apparatus 10 has a CPU 11, a storage device 12, an ROM 13, an RAM 14, an input I/F 15A, an output I/F 15B, a communication I/F 15C, an input device 16 connected to the input I/F 15A, and a display device 17 connected to the output I/F 15B. Each of the components 11 to 14 and 15A to 15C is connected to a system bus 18.

The storage device 12 is a hard disk, for example, and stores software (a program) for implementing a function of the image processing portion 100 shown in FIG. 1 (the components 110 to 180), software (a program) corresponding to the processing procedure for the preset selection processing shown in FIG. 2, and various programs which are installed, for example, an image processing program 12A.

Moreover, the storage device 12 fulfills the function of the preset storing portion 101 shown in FIG. 1 and stores at least one preset.

The image processing program 12A includes software (a program) for implementing functions of the image input portion 110, the preset image processing portion 120, the image type discriminating portion 130, the image density calculating portion 140, the preset reading portion 150, the preset selecting portion 160, the preset saving portion 170 and the image output portion 180 in the image processing portion 100 shown in FIG. 1. In the image processing portion 100, the preset saving portion 170 executes a storage processing process, the image type discriminating portion 130 executes a discrimination processing process, the image density calculating portion 140 executes a calculation processing process, and the preset selecting portion 160 executes a selection processing process.

The ROM 13 is a read only memory and stores equation information corresponding to the Equation 1 and communication protocol information for communicating with an external device. Moreover, the ROM 13 fulfills the function of the preset storing portion 101 shown in FIG. 1 and stores default print setting information.

The RAM 14 is an optional write/read memory and stores a program including the image processing program 12A read from the storage device 12 and print image data, and the equation information, the default print setting information and the communication protocol information which are read from the ROM 13.

Moreover, a storage area (a work area) required for the processing of the image processing portion 100 is assigned to the RAM 14. The work area stores a middle result or a final result of each of the image processing to be executed by the preset image processing portion 120, the image type discrimination processing to be executed by the image type discriminating portion 130, and the image density calculation processing to be executed by the image density calculating portion 140, and the preset read by the preset reading portion 150.

Each of the input I/F (input interface) 15A and the output I/F (output interface) 15B includes a CPU (a central processing unit) for executing a data communication. The input I/F 15A carries out a data communication with the input device 16 and the output I/F 15B carries out a data communication with the display device 17. The input device 16 fulfils the function of the input portion 102 shown in FIG. 1, and the display device 17 fulfils the function of the display portion 103 shown in FIG. 1.

The communication I/F (communication interface) 15C includes a CPU (a central processing unit) for executing a data communication, and reads the communication protocol information from the ROM 13 to the RAM 14 and executes the same information, thereby carrying out a data communication with a printer 90 serving as the image forming apparatus.

The CPU 11 is a central processing unit, and reads the program including the image processing program 12A from the storage device 12 to the RAM 14 and executes the same program, thereby implementing each of the functions of the image input portion 110, the preset image processing portion 120, the image type discriminating portion 130, the image density calculating portion 140, the preset reading portion 150, the preset selecting portion 160, the preset saving portion 170 and the image output portion 180 and realizing a processing function corresponding to the image processing program 12A. Moreover, the CPU 11 controls the whole image processing apparatus 10.

Second Exemplary Embodiment

Next, description will be given to an image processing apparatus according to a second exemplary embodiment.

The image processing apparatus according to the second exemplary embodiment has the same functional structure as the image processing apparatus 10 according to the first exemplary embodiment shown in FIG. 1.

In the second exemplary embodiment, functions of a preset storing portion 101, a preset image processing portion 120, an image density calculating portion 140 and a preset reading portion 150 are changed as compared with those in the first exemplary embodiment. Next, the changes of the components will be described.

The preset storing portion 101 stores default print setting information (a default set value related to printing), and furthermore, stores a preset including image type information, a CMYK image density in a default setting application and print setting information for each image.

The preset reading portion 150 reads all presets and the default print setting information from the preset storing portion 101.

The preset image processing portion 120 generates output plane information (a bit mask) for each of C, M, Y and K colors from print image data (RGB print image data) received from an image input portion 110. The output plane information for each of the C, M, Y and K colors is given to the image density calculating portion 140.

Moreover, the preset image processing portion 120 outputs the print image data received from the image input portion 110 and the print setting information included in the specific preset transferred from a preset selecting portion 160 as a print job to an image output portion 180.

When generating the output plane information for each of the C, M, Y and K colors, the preset image processing portion 120 executes a color conversion processing for carrying out a color conversion from an RGB color space into a CMYK color space based on a multidimensional (three-dimensional) look-up table (LUT) for a color space conversion over the print image data (RGB print image data) received from the image input portion 110, and furthermore, executes a tone correction processing for carrying out a tone correction based on a tone reproduction curve (TRC) over the print image data of the CMYK color space subjected to the color conversion processing.

Next, the preset image processing portion 120 acquires at least one of the presets (all of the presets) read by the preset reading portion 150 and acquires the default print setting information read by the preset reading portion 150, and furthermore, executes an image processing based on the acquired default print setting information over the print image data (CMYK print image data) subjected to the image processing.

Furthermore, the preset image processing portion 120 generates the output plane information (the bit mask) for each of the C, M, Y and K colors based on the CMYK print image data subjected to the image processing based on the default print setting information.

The image density calculating portion 140 calculates a CMYK image density related to a print image (an image density related to an image for each color of the CMYK color space).

More specifically, the image density calculating portion 140 calculates the CMYK image density (the image density related to the image for each color of the CMYK color space) based on the output plane information for each of the C, M, Y and K colors received from the preset image processing portion 120.

Referring to an image (CMYK image) A represented by the C, M, Y and K colors in the CMYK color space, the image density calculating portion 140 calculates the following Equation 2 to obtain the CMYK image density, wherein an image density related to the image A having the C color is represented by Ca, an image density related to the image A having the M color is represented by Ma, an image density related to the image A having the Y color is represented by Ya, and an image density related to the image A having the K color is represented by Ka. An image size of the CMYK image A has a width and a height in transverse and longitudinal directions, respectively.

$$Ca = \sum_{x=0}^{width-1} \sum_{y=0}^{height-1} P_C(x, y)$$

$$Ma = \sum_{x=0}^{width-1} \sum_{y=0}^{height-1} P_M(x, y)$$

$$Ya = \sum_{x=0}^{width-1} \sum_{y=0}^{height-1} P_Y(x, y)$$

$$Ka = \sum_{x=0}^{width-1} \sum_{y=0}^{height-1} P_K(x, y)$$

[Equation 2]

$P_C(x, y)$ indicates a value of the C color of a pixel having coordinates (x, y) of the image A, $P_M(x, y)$ indicates a value of the M color of a pixel having coordinates (x, y) of the image A, $P_Y(x, y)$ indicates a value of the Y color of a pixel having coordinates (x, y) of the image A, and $P_K(x, y)$ indicates a value of the K color of a pixel having coordinates (x, y) of the image A.

Figure 5:
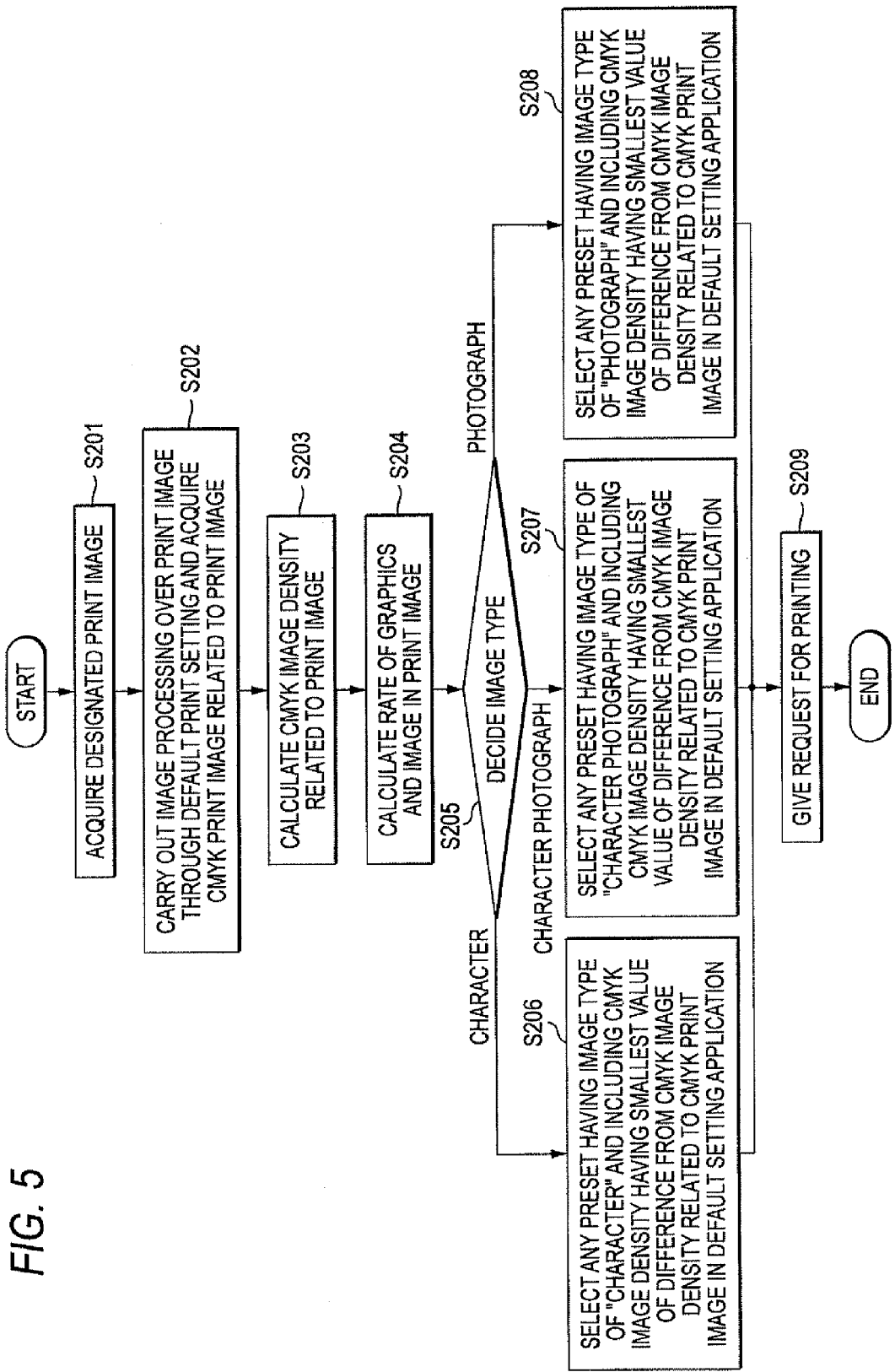
FIG. 5 is a flowchart showing a processing procedure for a preset selection processing in an image processing apparatus according to a second exemplary embodiment.

Next, a preset selection processing of the image processing apparatus 10 will be described with reference to FIG. 5.

When an "OK" button in a print dialog offered by an application is pressed down by a user in the same manner as in the first exemplary embodiment, an image processing portion 100 serving as a printer driver is started.

In the started image processing portion 100, the preset reading portion 150 reads all of the presets and the default print setting information from the preset storing portion 101.

Moreover, the image input portion 110 reads print image data to be a printing target image (RGB print image data) from the application (Step S201) and outputs the print image data thus read to the preset image processing portion 120 and an image type discriminating portion 130.

The preset image processing portion 120 executes an image processing such as the color conversion processing or the tone correction processing over the print image data (the RGB print image data) received from the image input portion 110. A result of the image processing produces the CMYK print image data.

Next, the preset image processing portion 120 acquires at least one preset (all of the presets) read by the preset reading portion 150 and acquires the default print setting information read by the preset reading portion 150, and furthermore, executes an image processing based on the acquired default print setting information over the print image data (CMYK print image data) subjected to the image processing and generates output plane information for each of the C, M, Y and K colors based on the CMYK print image data to be a result of the image processing (Step S202). The result thus generated (the output plane information for each of the C, M, Y and K colors) is given to the image density calculating portion 140.

The image density calculating portion 140 calculates a CMYK image density based on the output plane information for each of the C, M, Y and K colors transferred from the preset image processing portion 120 (Step S203). In other words, the image density calculating portion 140 calculates the Equation 2 to obtain the CMYK image density.

The CMYK image density calculated at the Step S203 is related to a print image applying the default print setting information.

The image type discriminating portion 130 receiving the print image data from the image input portion 110 calculates a rate of graphics in a wide sense and an image in a print image based on the print image data (Step S204), discriminates an image type of the print image based on a result of the calculation (Step 205), and outputs a result of the discrimination to the preset selecting portion 160.

The preset selecting portion 160 receiving the result of the discrimination from the image type discriminating portion 130 and the CMYK image density from the image density calculating portion 140 selects any of all the presets which is read by the preset reading portion 150 and includes image type information indicative of the type of the image which is discriminated by the image type discriminating portion 130, that is, a preset including the CMYK image density in a default setting application having the smallest value of a difference from the CMYK image density calculated by the image density calculating portion 140 (Steps S206 to S208).

More specifically, the preset selecting portion 160 selects any of all the presets which is read by the preset reading portion 150 and has image type information indicative of a "character", that is, a preset including the CMYK image density in the default setting application having the smallest value of the difference from the CMYK image density calculated by the image density calculating portion 140 if the image type transferred from the image type discriminating portion 130 is the "character" (Step S206).

Moreover, the preset selecting portion 160 selects any of all the presets which is read by the preset reading portion 150 and has image type information indicative of a "character photograph", that is, a preset including the CMYK image density in the default setting application having the smallest value of the difference from the CMYK image density calculated by the image density calculating portion 140 if the image type transferred from the image type discriminating portion 130 is the "character photograph" (Step S207).

Furthermore, the preset selecting portion 160 selects any of all the presets which is read by the preset reading portion 150 and has image type information indicative of a "photograph", that is, a preset including the CMYK image density in the default setting application having the smallest value of the difference from the CMYK image density calculated by the image density calculating portion 140 if the image type transferred from the image type discriminating portion 130 is the "photograph" (Step S208).

Then, the preset selecting portion 160 outputs the specific preset selected as described above to the preset image processing portion 120.

The preset image processing portion 120 outputs, as a print job to the image output portion 180, the print image data which have already been received from the image input portion 110 and print setting information included in the specific preset transferred from the preset selecting portion 160.

The image output portion 180 outputs the print job transferred from the preset image processing portion 120 toward the printer which is not shown, thereby giving a request for printing (Step S209).

If a value of a difference between the CMYK image density to be the index value included in the specific preset which is selected by the preset selecting portion 160 and the CMYK image density related to the print image calculated by the image density calculating portion 140 exceeds a threshold, the preset saving portion 170 saves the image type information about the print image, the CMYK image density to be the index value (the CMYK image density in the default setting application) and the print setting information as a novel preset in the preset storing portion 101.

A hardware structure of the image processing apparatus 10 according to the second exemplary embodiment is also the same as that of the image processing apparatus 10 according to the first exemplary embodiment shown in FIG. 4.

Third Exemplary Embodiment

Next, an image processing apparatus according to a third exemplary embodiment will be described.

Figure 6:
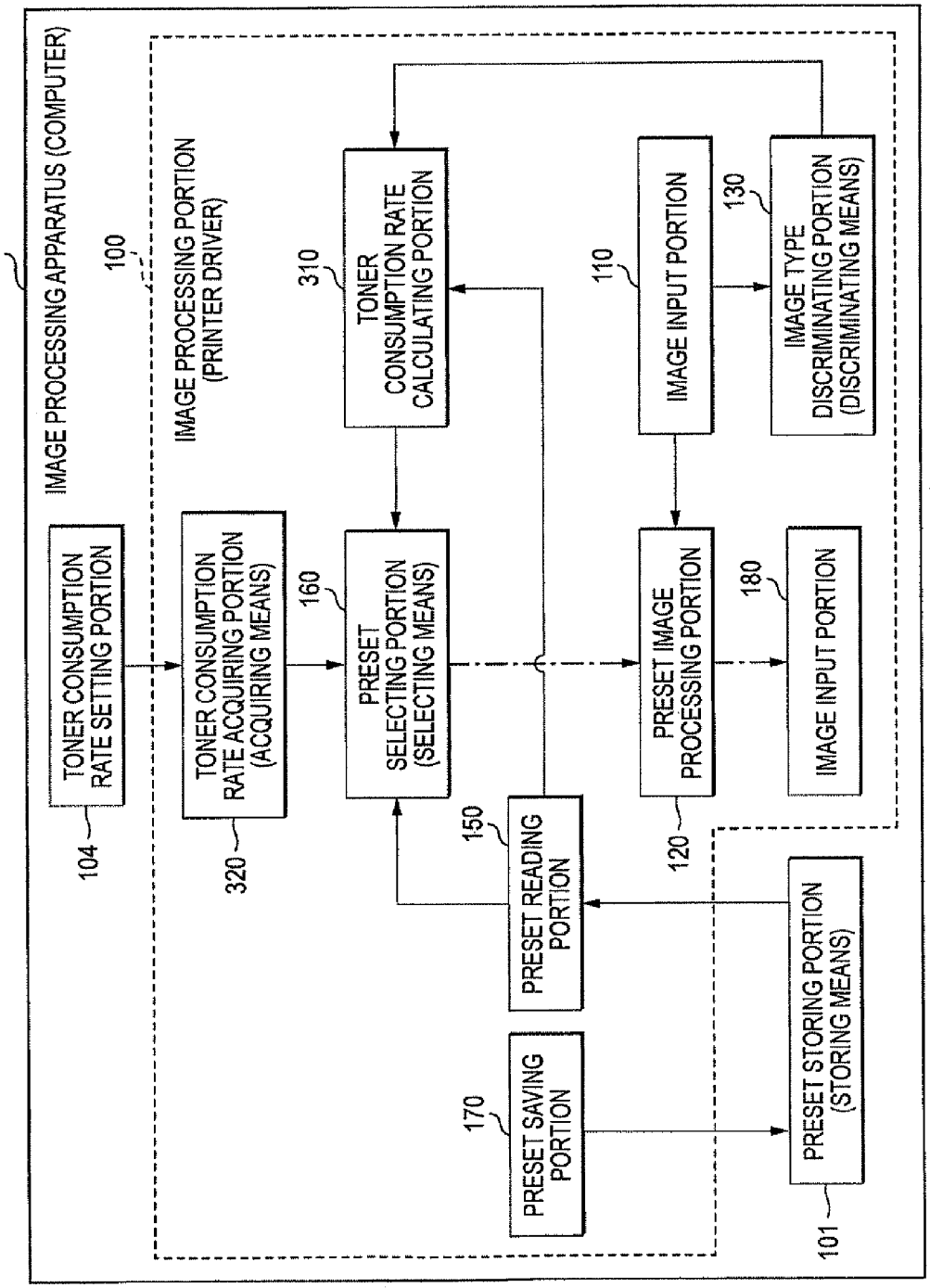
FIG. 6 is a block diagram showing a function of an image processing apparatus according to a third exemplary embodiment.

An image processing apparatus 30 according to the third exemplary embodiment has a structure shown in FIG. 6. The image processing apparatus 30 has a functional structure in which the image density calculating portion 140 is deleted and a toner consumption rate calculating portion 310, a toner consumption rate acquiring portion 320 and a toner consumption rate setting portion 104 are added to the image processing apparatus 10 according to the first exemplary embodiment shown in FIG. 1. In FIG. 6, portions fulfilling the same functions as the components shown in FIG. 1 have the same reference numerals. In FIG. 6, moreover, an input portion 102 and a display portion 103 are omitted.

In the third exemplary embodiment, functions of a preset storing portion 101, a preset image processing portion 120, an image type discriminating portion 130 and a preset selecting portion 160 are changed as compared with those in the first exemplary embodiment. Next, the changes of the components will be described.

The preset storing portion 101 stores, for each image, a preset including image type information, a CMYK image density in a default setting application, a CMYK image density in a print setting application and print setting information.

The preset image processing portion 120 outputs print image data received from an image input portion 110 and print setting information included in a specific preset transferred from the preset selecting portion 160 as a print job to an image output portion 180. The preset image processing portion 120 does not execute an image processing for the print image data.

The image type discriminating portion 130 outputs an image type to be a result of a discrimination to the toner consumption rate calculating portion 310.

The toner consumption rate calculating portion 310 has a function of calculating means and calculates a toner consumption rate related to an image corresponding to at least one preset which is read by a preset reading portion 150 and includes image type information indicative of the image type received from the image type discriminating portion 130 based on the CMYK image density in the print setting application and the CMYK image density in the default setting application which are included in the preset corresponding to the preset.

The toner consumption rate related to the image corresponding to the preset implies a second consumption rate of a recording material (a toner).

In other words, the toner consumption rate calculating portion 310 calculates {(a CMYK image density related to an image applying a print set value/a CMYK image density related to an image applying a default set value)×100}, that is, {(the CMYK image density in the print setting application/the CMYK image density in the default setting application)× 100} to obtain the toner consumption rate.

The toner consumption rate acquiring portion 320 acquires a toner consumption rate set by the toner consumption rate setting portion 104. The toner consumption rate thus acquired implies a first consumption rate of the recording material (the toner).

The toner consumption rate setting portion 104 is an input device, for example, and sets a toner consumption rate as the first consumption rate of the recording material.

The preset selecting portion 160 obtains a difference between the first consumption rate and the second consumption rate, and selects any of at least one preset which is read by the preset reading portion 150, includes the image type information indicative of the image type received from the image type discriminating portion 130 and corresponds to the second consumption rate of the recording material that has the smallest value of the difference.

Figure 7:
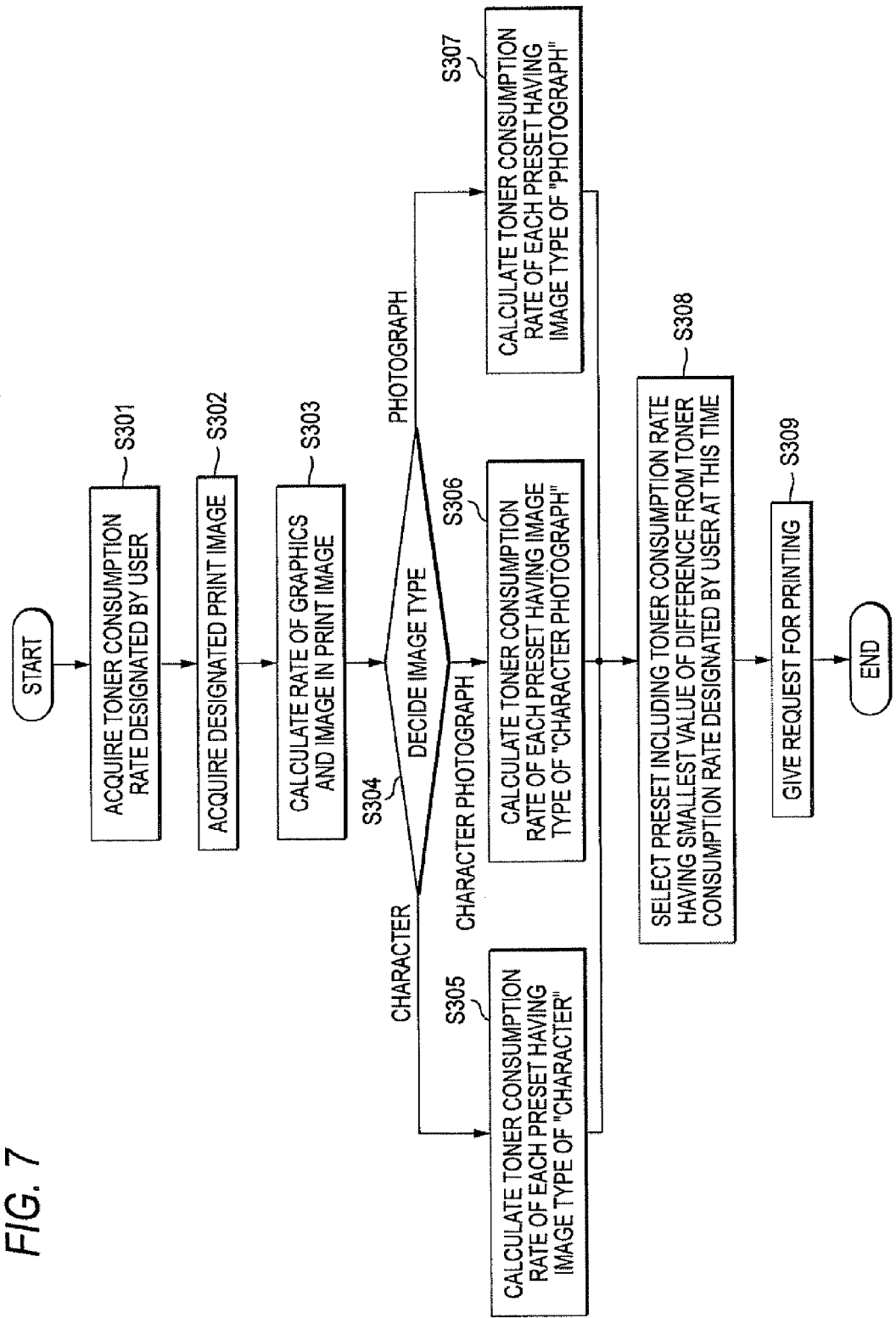
FIG. 7 is a flowchart showing a processing procedure for a preset selection processing in the image processing apparatus according to the third exemplary embodiment.

Next, a preset selection processing of the image processing apparatus 30 will be described with reference to FIG. 7.

In the example, the toner consumption rate set by a user (the first consumption rate of the recording material) is indicated to be the first toner consumption rate, and the toner consumption rate related to an image corresponding to a preset (the second consumption rate of the recording material) is indicated to be the second toner consumption rate.

The user operates the input portion 102 in a state in which an application that is being operated and started by the image processing apparatus 30 is displayed on the display portion 103, and gives a print command from the application and presses down a "property" button in a print dialog offered by the application and displayed on the display portion 103.

When the "property" button in the print dialog is thus pressed down, an image processing portion 100 serving as a printer driver is started.

Figure 8:
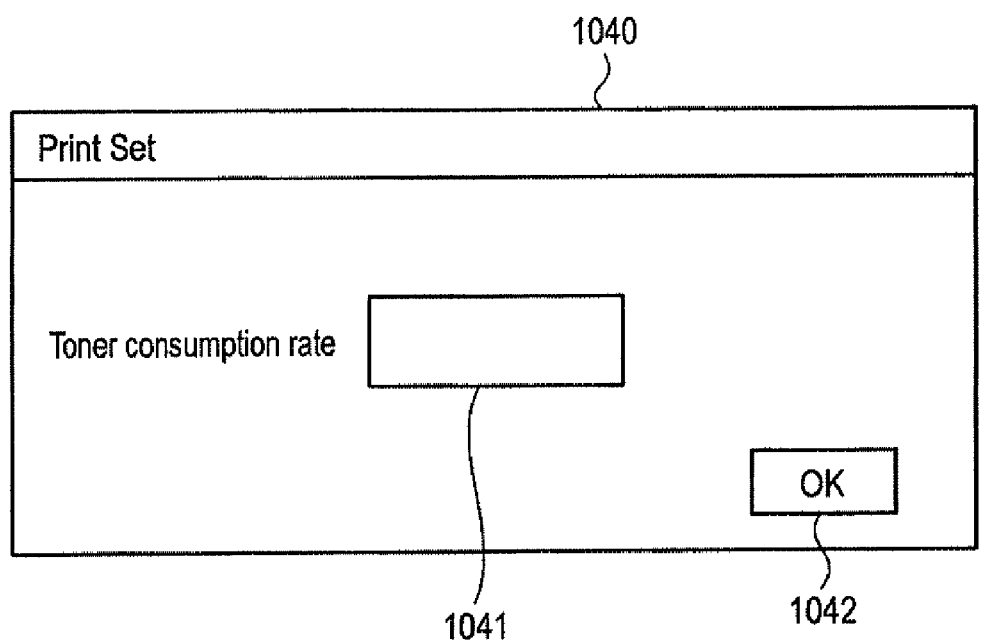
FIG. 8 is a diagram showing an example of a print setting property offered by an image processing portion of the image processing apparatus according to the third exemplary embodiment.

The image processing portion 100 thus started displays a print setting property (a driver property) 1040 shown in FIG. 8 on the display portion 103. The user operates the toner consumption rate setting portion 104 to set a desirable toner consumption rate (the first toner consumption rate) to a setting column 1041 for setting the toner consumption rate in the print setting property 1040 displayed on the display portion 103 and to then press down an "OK" button 1042.

When the first toner consumption rate is set to the setting column 1041 of the print setting property 1040 and the "OK" button 1042 is then pressed down, the toner consumption rate acquiring portion 320 acquires the first toner consumption rate set to the print setting property 1040 (Step S301) and the first toner consumption rate thus acquired is output to the preset selecting portion 160 in the image processing portion 100.

The preset reading portion 150 reads all of the presets from the preset storing portion 101.

The image input portion 110 reads print image data to be a printing target image (RGB print image data) from the application (Step S302) and outputs the print image data thus read to the preset image processing portion 120 and the image type discriminating portion 130.

The image type discriminating portion 130 calculates a rate of graphics in a wide sense and an image in a print image based on the print image data (Step S303) and discriminates an image type of the print image based on a result of the calculation (Step S304), and outputs a result of the discrimination to the toner consumption rate calculating portion 310.

The toner consumption rate calculating portion 310 calculates a toner consumption rate (the second toner consumption rate) based on a CMYK image density in a print setting application and a CMYK image density in a default setting application which are included in any of at least one preset that is read by the preset reading portion 150 and includes image type information indicative of the image type received from the image type discriminating portion 130 for the corresponding preset (Steps S305 to S307).

More specifically, the toner consumption rate calculating portion 310 extracts the CMYK image density in the default setting application and the CMYK image density in the print setting application from any of all the presets which is read by the preset reading portion 150 and has image type information indicative of a "character" and calculates the second toner consumption rate based on the CMYK image density in the default setting application and the CMYK image density in the print setting application which are thus extracted if the image type transferred from the image type discriminating portion 130 is the "character" (Step S305).

Moreover, the toner consumption rate calculating portion 310 extracts the CMYK image density in the default setting application and the CMYK image density in the print setting application from any of all the presets which is read by the preset reading portion 150 and has image type information indicative of a "character photograph" and calculates the second toner consumption rate based on the CMYK image density in the default setting application and the CMYK image density in the print setting application which are thus extracted if the image type transferred from the image type discriminating portion 130 is the "character photograph" (Step S306).

Furthermore, the toner consumption rate calculating portion 310 extracts the CMYK image density in the default setting application and the CMYK image density in the print setting application from any of all the presets which is read by the preset reading portion 150 and has image type information indicative of a "photograph" and calculates the second toner consumption rate based on the CMYK image density in the default setting application and the CMYK image density in the print setting application which are thus extracted if the image type transferred from the image type discriminating portion 130 is the "photograph" (Step S307).

Then, the toner consumption rate calculating portion 310 relates the preset to the second toner consumption rate and outputs them to the preset selecting portion 160 when calculating the second toner consumption rate for the preset having the image type information corresponding to the image type which is discriminated by the image type discriminating portion 130.

The preset selecting portion 160 receiving the preset and the second toner consumption rate from the toner consumption rate calculating portion 310 obtains a difference between the second toner consumption rate corresponding to the received preset and the first toner consumption rate which has already been received from the toner consumption rate acquiring portion 320, and furthermore, selects any of at least one preset which is read from the preset reading portion 150 and includes the image type information indicative of the image type received from the image type discriminating portion 130, that is, a preset corresponding to the second consumption rate which has the smallest value of the difference (Step S308).

Thereafter, the preset selecting portion 160 outputs the specific preset selected as described above to the preset image processing portion 120.

The preset image processing portion 120 outputs the print image data which have already been received from the image input portion 110 and print setting information included in the specific preset transferred from the preset selecting portion 160 as a print job to the image output portion 180.

The image output portion 180 outputs the print job transferred from the preset image processing portion 120 toward a printer which is not shown, thereby giving a request for printing (Step S309).

A hardware structure of the image processing apparatus 30 according to the third exemplary embodiment is also the same as that of the image processing apparatus 10 according to the first exemplary embodiment shown in FIG. 4.

An image processing program 12A stored in a storage device 12 includes software (a program) for implementing each of functions of the image input portion 110, the preset image processing portion 120, the image type discriminating portion 130, the preset reading portion 150, the preset selecting portion 160, a preset saving portion 170, the image output portion 180, the toner consumption rate calculating portion 310 and the toner consumption rate acquiring portion 320 in the image processing portion 100 shown in FIG. 6.

Fourth Exemplary Embodiment

Next, an image processing apparatus according to a fourth exemplary embodiment will be described.

Figure 9:
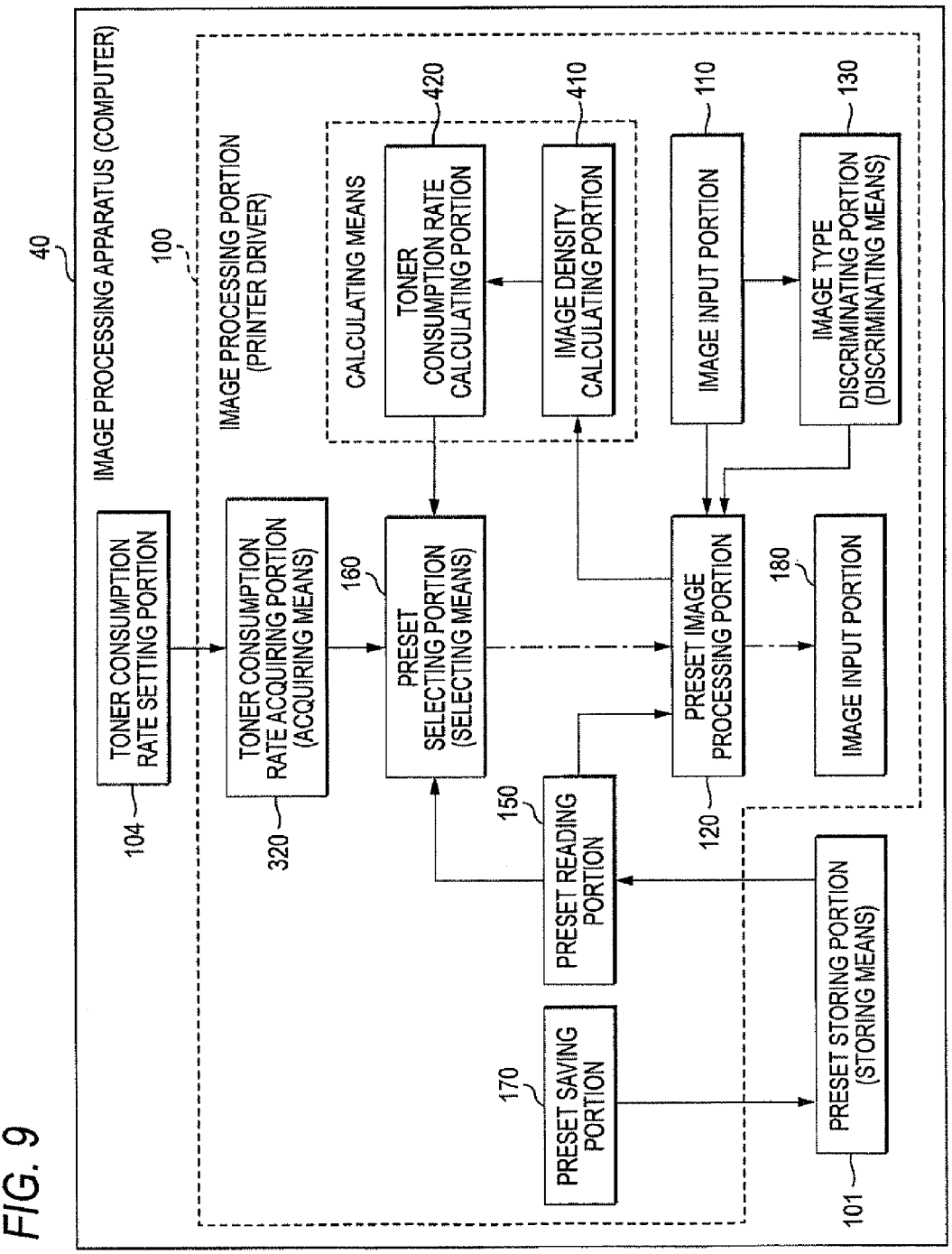
FIG. 9 is a block diagram showing a function of an image processing apparatus according to a fourth exemplary embodiment.

An image processing apparatus 40 according to the fourth exemplary embodiment has a structure shown in FIG. 9. The image processing apparatus 40 has a functional structure in which an image density calculating portion 410 is additionally provided and the toner consumption rate calculating portion 310 is changed into a toner consumption rate calculating portion 420 in the image processing apparatus 30 according to the third exemplary embodiment shown in FIG. 6. In FIG. 9, portions fulfilling the same functions as the components shown in FIG. 6 have the same reference numerals. In FIG. 9, moreover, an input portion 102 and a display portion 103 are omitted.

In the fourth exemplary embodiment, functions of a preset image processing portion 120, an image type discriminating portion 130, a preset reading portion 150 and a preset selecting portion 160 are changed as compared with those in the third exemplary embodiment. Next, the changes of the components will be described.

The preset reading portion 150 reads all presets and default print setting information from a preset storing portion 101.

The image type discriminating portion 130 outputs an image type to be a result of a discrimination to the preset image processing portion 120.

The preset image processing portion 120 generates output plane information for each of C, M, Y and K colors from print image data (RGB print image data) received from an image input portion 110. The output plane information for each of the C, M, Y and K colors is given to an image density calculating portion 140.

Moreover, the preset image processing portion 120 outputs the print image data received from the image input portion 110 and print setting information included in a specific preset transferred from the preset selecting portion 160 as a print job to an image output portion 180.

In the generation of the output plane information for each of the C, M, Y and K colors, the preset image processing portion 120 generates two types of output plane information for each of the C, M, Y and K colors.

In other words, the preset image processing portion 120 executes an image processing such as the color conversion processing or the tone correction processing over the print image data (RGB print image data) received from the image input portion 110 in order to generate output plane information of a first type. As a result of the image processing, CMYK print image data are obtained.

Next, the preset image processing portion 120 acquires any of at least one preset (all of the presets) which is read by the preset reading portion 150 and includes image type information indicative of the image type discriminated by the image type discriminating portion 130, and furthermore, executes an image processing based on the print setting information included in a corresponding preset to the CMYK print image data every acquired preset.

A print image (a CMYK print image) to be a result of the image processing is defined to be a print image in a print setting application (a CMYK print image in a print setting application of the print setting information in the preset), The preset image processing portion 120 generates output plane information for each of the C, M, Y and K colors based on the print image in the print setting application (the CMYK print image in the print setting application). The output plane information for each of the C, M, Y and K colors corresponding to the print image in the print setting application is given to the image density calculating portion 140.

Next, the preset image processing portion 120 acquires the default print setting information read by the preset reading portion 150 and executes an image processing based on the acquired default print setting information over the CMYK print image data in order to generate output plane information of a second type.

A print image (a CMYK print image) to be a result of the image processing is defined to be a print image in a default setting application (a CMYK print image in a default setting application).

Subsequently, the preset image processing portion 120 generates output plane information for each of the C, M, Y and K colors based on the print image in the default setting application (the CMYK print image in the default setting application). The output plane information for each of the C, M, Y and K colors corresponding to the print image in the default setting application is given to the image density calculating portion 140.

In the fourth exemplary embodiment, a function of calculating means is fulfilled in cooperation of the image density calculating portion 410 with the toner consumption rate calculating portion 420, and a second toner consumption rate related to a print image (a second consumption rate of a recording material) is calculated based on any of presets which is stored in the preset storing portion 101 and includes image type information indicative of the image type discriminated by the image type discriminating portion 130 corresponding to the preset.

In other words, the image density calculating portion 410 calculates a CMYK image density (an image density related to an image for each color of a CMYK color space) based on output plane information for each of the C, M, Y and K colors corresponding to the print image in the print setting application which is generated by the preset image processing portion 120, and furthermore, calculates a CMYK image density (an image density related to an image for each color of a CMYK color space) based on output plane information for each of the C, M, Y and K colors corresponding to the print image in the default setting application which is generated by the preset image processing portion 120 as described above.

The toner consumption rate calculating portion 420 calculates a second toner consumption rate related to a print image (a second consumption rate of a recording material) based on the CMYK image density related to the print image (in the print setting application (the CMYK print image) which is calculated by the image density calculating portion 410 corresponding to any of the at least one preset (all of the presets) which includes the image type information indicative of the image type discriminated by the image type discriminating portion 130 and the CMYK image density related to the print image in the default setting application (the CMYK print image) which is calculated by the image density calculating portion 410.

Then, the toner consumption rate calculating portion 420 calculates {(the CMYK image density in the print setting application/the CMYK image density in the default setting application)×100} to obtain the toner consumption rate.

In this case, there is calculated the second toner consumption rate related to the print image for each preset including the image type information indicative of the image type discriminated by the image type discriminating portion 130. The second toner consumption rate related to the print image for the preset which is thus calculated is given to the preset selecting portion 160.

The preset selecting portion 160 obtains a difference between a first toner consumption rate acquired by a toner consumption rate acquiring portion 320 and the second toner consumption rate calculated by the toner consumption rate calculating portion 420, and furthermore, selects any of the at least one preset which is read by the preset reading portion 150 (at least one preset which is stored in the preset storing portion 101) and includes the image type information indicative of the image type discriminated by the image type discriminating portion 130, and corresponds to the second toner consumption rate having the smallest value of the difference.

Figure 10:
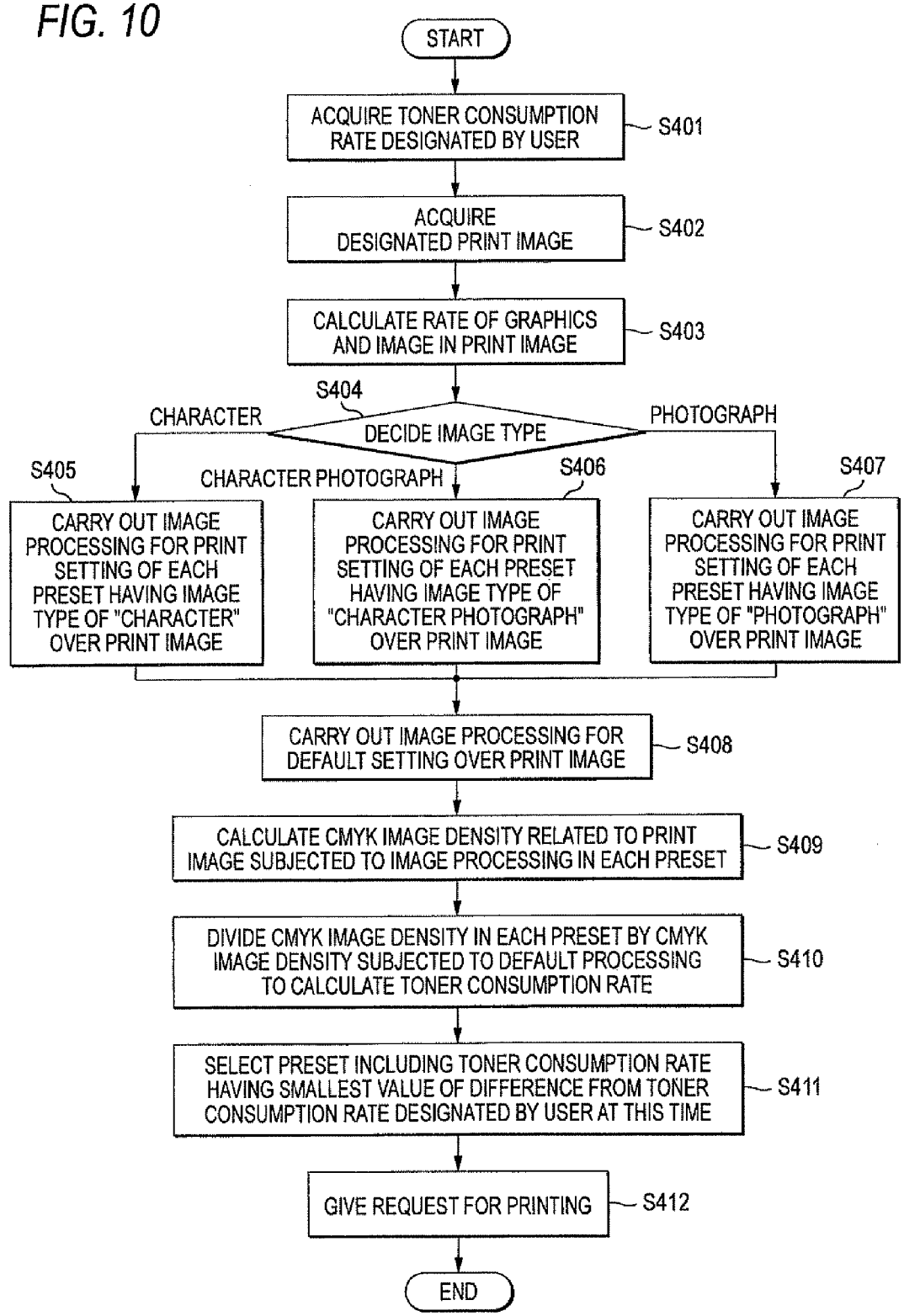
FIG. 10 is a flowchart showing a processing procedure for a preset selection processing in the image processing apparatus according to the fourth exemplary embodiment.

Next, a preset selection processing of the image processing apparatus 40 will be described with reference to FIG. 10.

In the same manner as the operation for setting a desirable toner consumption rate (the first toner consumption rate) according to the third exemplary embodiment, a user gives a print command from an application and presses down a "property" button in a print dialog, and sets a desirable toner consumption rate (the first toner consumption rate) to a setting column 1041 in a print setting property (a driver property) 1040 (see FIG. 8) displayed on the display portion 103 due to the press-down of the "property" button in the print dialog and then presses down an "OK" button 1042.

When the first toner consumption rate is set to the setting column 1041 of the print setting property 1040 and the "OK" button 1042 is pressed down, the toner consumption rate acquiring portion 320 acquires the first toner consumption rate set to the print setting property 1040 (Step S401) and outputs the first toner consumption rate thus acquired to the preset selecting portion 160 in an image processing portion 100.

The preset reading portion 150 reads all of the presets and the default print setting information from the preset storing portion 101.

The image input portion 110 reads print image data to be a printing target image (RGB print image data) from the application (Step S402) and outputs the print image data thus read to the preset image processing portion 120 and the image type discriminating portion 130.

The image type discriminating portion 130 calculates a rate of graphics in a wide sense and an image in a print image based on the print image data (Step S403) and discriminates an image type of the print image based on a result of the calculation (Step S404), and outputs a result of the discrimination to the preset image processing portion 120.

The preset image processing portion 120 acquires any of the at least one preset (all of the presets) which is read by the preset reading portion 150 and includes the image type information indicative of the image type discriminated by the image type discriminating portion 130, and furthermore, generates output plane information for each of the C, M, Y and K colors corresponding to a print image in a print setting application (a CMYK print image in a print setting application) applying print setting information included in the corresponding preset every acquired preset (Steps S405 to S407).

In other words, the preset image processing portion 120 executes an image processing such as the color conversion processing or the tone correction processing over the print image data (RGB print image data) received from the image input portion 110 and generates CMYK print image data.

Next, the preset image processing portion 120 executes an image processing based on the print setting information included in the corresponding preset over the CMYK print image data for each acquired preset, thereby generating the print image in the print setting application (the CMYK print image in the print setting application of the print setting information in the preset).

Subsequently, the preset image processing portion 120 generates the output plane information for each of the C, M, Y and K colors based on the print image in the print setting application (the CMYK print image in the print setting application).

More specifically, the preset image processing portion 120 acquires any of all the presets which is read by the preset reading portion 150 and has image type information indicative of a "character", and generates output plane information for each of the C, M, Y and K colors corresponding to the print image in the print setting application (the CMYK print image in the print setting application) applying the print setting information included in the corresponding preset for each acquired preset if the image type transferred from the image type discriminating portion 130 is the "character" (Step S405).

The output plane information for each of the C, M, Y and K colors corresponding to the print image in the print setting application for each preset which is thus generated is given to the image density calculating portion 140.

Moreover, the preset image processing portion 120 acquires any of all the presets which is read by the preset reading portion 150 and has image type information indicative of a "character photograph", and generates output plane information for each of the C, M, Y and K colors corresponding to the print image in the print setting application (the CMYK print image in the print setting application) applying the print setting information included in the corresponding preset for each acquired preset if the image type transferred from the image type discriminating portion 130 is the "character photograph" (Step S406).

The output plane information for each of the C, M, Y and K colors corresponding to the print image in the print setting application for each preset which is thus generated is given to the image density calculating portion 140.

Furthermore, the preset image processing portion 120 acquires any of all the presets which is read by the preset reading portion 150 and has image type information indicative of a "photograph", and generates output plane information for each of the C, M, Y and K colors corresponding to the print image in the print setting application (the CMYK print image in the print setting application) applying the print setting information included in the corresponding preset for each acquired preset if the image type transferred from the image type discriminating portion 130 is the "photograph" (Step S407).

The output plane information for each of the C, M, Y and K colors corresponding to the print image in the print setting application for each preset which is thus generated is given to the image density calculating portion 140.

The preset image processing portion 120 subjected to the Step S405, S406 or S407 acquires the default print setting information read by the preset reading portion 150 and executes an image processing based on the acquired default print setting information over the print image data received from the image input portion 110, and furthermore, generates output plane information for each of the C, M, Y and K colors based on the print image in the default setting application to be a result of the image processing (the CMYK print image in the default setting application) (step S408).

The output plane information for each of the C, M, Y and K colors corresponding to the print image in the default setting application is given to the image density calculating portion 140.

The image density calculating portion 410 calculates a CMYK image density for each preset (an image density related to an image for each color of a CMYK color space) based on the output plane information for each of the C, M, Y and K colors corresponding to the print image in the print setting application for each preset which is received from the preset image processing portion 120 (Step S409).

Moreover, the image density calculating portion 410 calculates a CMYK image density (an image density related to an image for each color of the CMYK color space) based on the output plane information for each of the C, M, Y and K colors corresponding to the print image in the default setting application (the CMYK print image) which is received from the preset image processing portion 120.

The toner consumption rate calculating portion 420 calculates a second toner consumption rate related to a print image (a second consumption rate of a recording material) based on the CMYK image density related to the print image in the print setting application (the CMYK print image) which is calculated by the image density calculating portion 410 corresponding to any of the at least one preset (all of the presets) which includes the image type information indicative of the image type discriminated by the image type discriminating portion 130 and the CMYK image density related to the print image in the default setting application (the CMYK print image) which is calculated by the image density calculating portion 410 (Step S410).

In other words, the toner consumption rate calculating portion 420 calculates {(the CMYK image density in the print setting application/the CMYK image density in the default setting application)×100} to obtain the second toner consumption rate corresponding to each preset including the image type information indicative of the image type discriminated by the image type discriminating portion 130.

The second toner consumption rate corresponding to each of the presets obtained as described above is given to the preset selecting portion 160.

The preset selecting portion 160 obtains a difference between the first toner consumption rate acquired by the toner consumption rate acquiring portion 320 and the second toner consumption rate acquired from the toner consumption rate calculating portion 420 and corresponding to each preset, and furthermore, selects any of the at least one preset which is read by the preset reading portion 150 and includes the image type information indicative of the image type received from the image type discriminating portion 130, that is, a preset corresponding to the second toner consumption rate having the smallest value of the difference (Step S411).

Then, the preset selecting portion 160 outputs the specific preset selected as described above to the preset image processing portion 120.

The preset image processing portion 120 outputs, as a print job to the image output portion 180, the print image data which have already been received from the image input portion 110 and print setting information included in the specific preset transferred from the preset selecting portion 160.

The image output portion 180 outputs the print job transferred from the preset image processing portion 120 toward a printer which is not shown, thereby giving a request for printing (Step S412).

A hardware structure of the image processing apparatus 40 according to the fourth exemplary embodiment is also the same as that of the image processing apparatus 10 according to the first exemplary embodiment shown in FIG. 4.

An image processing program 12A stored in a storage device 12 includes software (a program) for implementing each of functions of the image input portion 110, the preset image processing portion 120, the image type discriminating portion 130, the preset reading portion 150, the preset selecting portion 160, a preset saving portion 170, the image output portion 180, the toner consumption rate acquiring portion 320, the image density calculating portion 410 and the toner consumption rate calculating portion 420 in the image processing portion 100 shown in FIG. 9.

Fifth Exemplary Embodiment

Next, an image processing apparatus according to a fifth exemplary embodiment will be described.

Figure 11:
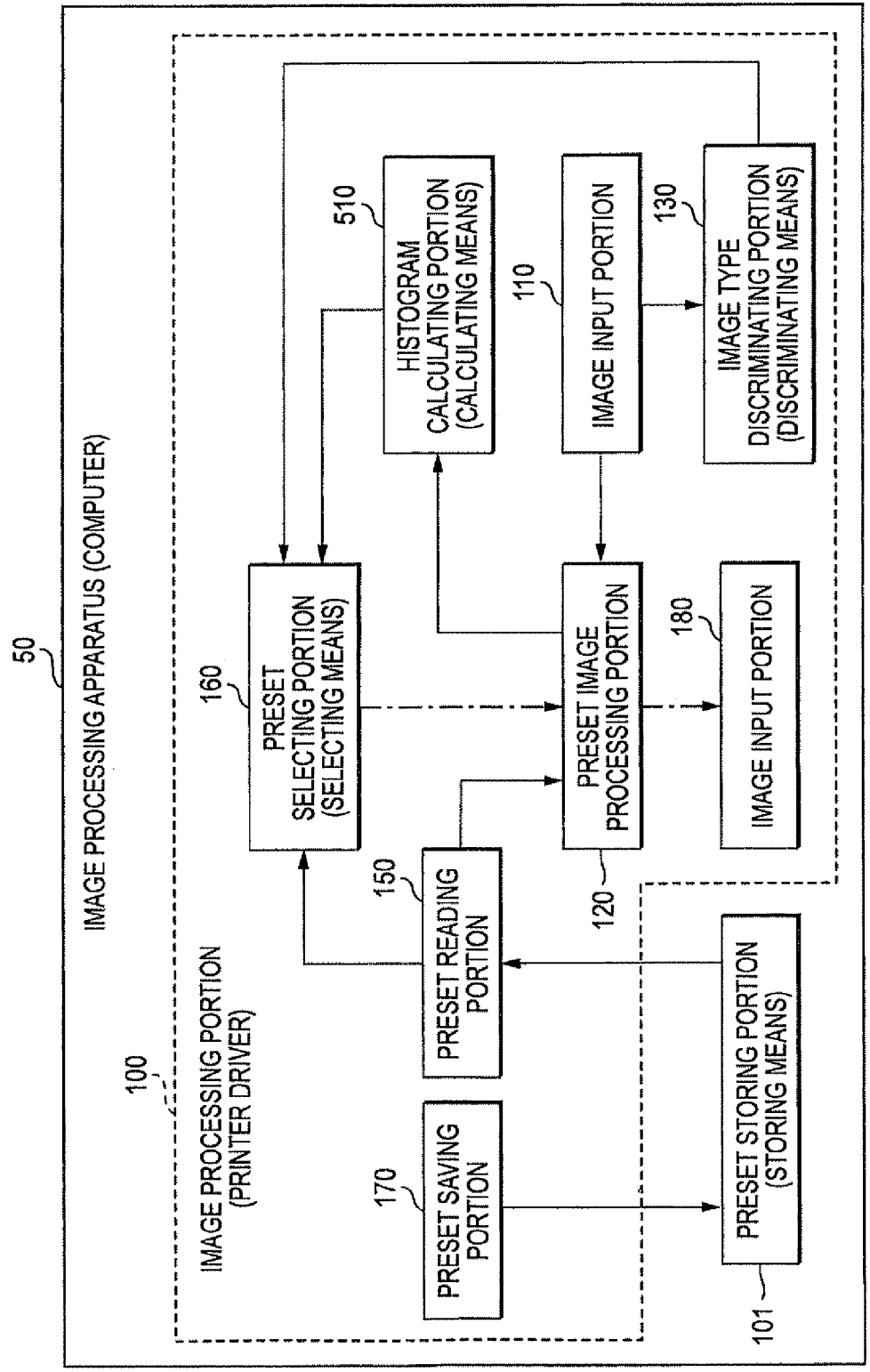
FIG. 11 is a block diagram showing a function of an image processing apparatus according to a fifth exemplary embodiment.

An image processing apparatus 50 according to the fifth exemplary embodiment has a structure shown in FIG. 11. The image processing apparatus 50 has a functional structure in which the image density calculating portion 140 is deleted and a histogram calculating portion 510 is additionally provided in the image processing apparatus 10 according to the first exemplary embodiment shown in FIG. 1. In FIG. 11, portions fulfilling the same functions as the components shown in FIG. 1 have the same reference numerals. In FIG. 11, moreover, an input portion 102 and a display portion 103 are omitted.

In the fifth exemplary embodiment, functions of a preset storing portion 101 and a preset image processing portion 120 are changed as compared with those in the first exemplary embodiment. Next, the changes of the components will be described.

The preset storing portion 101 stores a preset including image type information, an RGB histogram and print setting information for each image.

The preset image processing portion 120 exactly outputs RGB print image data received from an image input portion 110 to the histogram calculating portion 510.

Moreover, the preset image processing portion 120 outputs the print image data received from the image input portion 110 and the print setting information included in a specific preset transferred from a preset selecting portion 160 as a print job to an image output portion 180.

The histogram calculating portion 510 has a function of calculating means and serves to calculate the index value, and calculates an image density related to an image for each color of a predetermined color space related to RGB print image data received from the preset image processing portion 120, for example. In the fifth exemplary embodiment, the histogram calculating portion 510 calculates an RGB histogram (a histogram related to an image for each color of an RGB color space).

Figure 12:
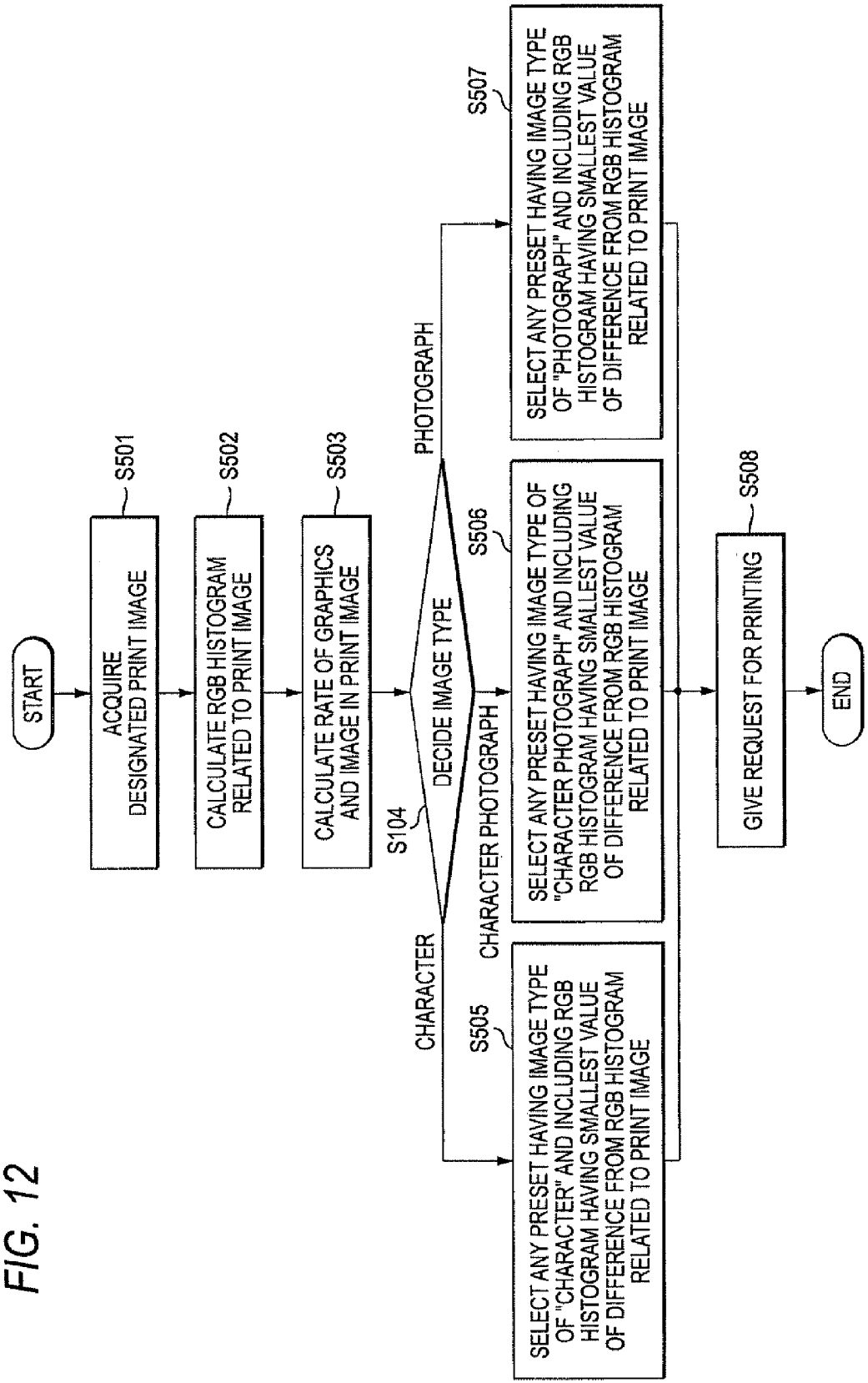
FIG. 12 is a flowchart showing a processing procedure for a preset selection processing in the image processing apparatus according to the fifth exemplary embodiment.

Next, a preset selection processing of the image processing apparatus 50 will be described with reference to FIG. 12.

In the example, it is assumed that the image input portion 110 reads RGB print image data having the number of tones of 256 (a tone value of 0 to 255) from an application, for instance.

A user operates the input portion 102 in a state in which an application that is being operated and started by the image processing apparatus 10 is displayed on the display portion 103, and gives a print command from the application and presses down an "OK" button in a print dialog offered by the application and displayed on the display portion 103.

When the "OK" button in the print dialog is thus pressed down, an image processing portion 100 serving as a printer driver is started. In the image processing portion 100 thus started, a preset reading portion 150 reads all of the presets from the preset storing portion 101.

Moreover, the image input portion 110 reads print image data to be a printing target image (RGB print image data) from the application (Step S501) and outputs the print image data thus read to the preset image processing portion 120 and an image type discriminating portion 130.

The preset image processing portion 120 exactly outputs the RGB print image data received from the image input portion 110 to the histogram calculating portion 510.

The histogram calculating portion 510 calculates an RGB histogram related to the RGB print image data transferred from the preset image processing portion 120 (a histogram related to the image for each color of the RGB color space) (Step S502).

In this case, the histogram calculating portion 510 obtains an accumulated value of the number of pixels for each of the tone values of 0 to 255 for the RGB print image data, thereby calculating the RGB histogram.

The image type discriminating portion 130 receiving the print image data from the image input portion 110 calculates a rate of graphics in a wide sense and an image in a print image based on the print image data (Step S503), discriminates an image type of the print image based on a result of the calculation (Step S504), and outputs a result of the discrimination to the preset selecting portion 160.

The preset selecting portion 160 receiving a result of the discrimination from the image type discriminating portion 130 and the RGB histogram from the histogram calculating portion 510 selects any of all presets which is read by the preset reading portion 150 and includes image type information indicative of the type of the image which is discriminated by the image type discriminating portion 130, that is, a preset including the RGB histogram having the smallest value of a difference from the RGB histogram calculated by the histogram calculating portion 510 (Steps S505 to S507).

The details of a way for obtaining the preset including the RGB histogram having the smallest value of the difference will be described below.

More specifically, the preset selecting portion 160 selects any of all the presets which is read by the preset reading portion 150 and has image type information indicative of a "character", that is, a preset including the RGB histogram having the smallest value of the difference from the RGB histogram calculated by the histogram calculating portion 510 if the image type transferred from the image type discriminating portion 130 is the "character" (Step S505).

Moreover, the preset selecting portion 160 selects any of all the presets which is read by the preset reading portion 150 and has image type information indicative of a "character photograph", that is, a preset including the RGB histogram having the smallest value of the difference from the RGB histogram calculated by the histogram calculating portion 510 if the image type transferred from the image type discriminating portion 130 is the "character photograph" (Step S506).

Furthermore, the preset selecting portion 160 selects any of all the presets which is read by the preset reading portion 150 and has image type information indicative of a "photograph", that is, a preset including the RGB histogram having the smallest value of the difference from the RGB histogram calculated by the histogram calculating portion 510 if the image type transferred from the image type discriminating portion 130 is the "photograph" (Step S507).

Then, the preset selecting portion 160 outputs the specific preset selected as described above to the preset image processing portion 120.

The preset image processing portion 120 outputs, as a print job to the image output portion 180, the print image data which have already been received from the image input portion 110 and print setting information included in the specific preset transferred from the preset selecting portion 160.

The image output portion 180 outputs the print job transferred from the preset image processing portion 120 toward the printer which is not shown, thereby giving a request for printing (Step S508).

If a value of a difference between the RGB histogram to be the index value included in the specific preset which is selected by the preset selecting portion 160 and the RGB histogram related to the print image calculated by the histogram calculating portion 510 exceeds a threshold, a preset saving portion 170 saves the image type information about the print image, the RGB histogram to be the index value and the print setting information as a novel preset in the preset storing portion 101.

Next, description will be given to a way for obtaining the preset including the RGB histogram (the RGB histogram related to an image corresponding to the preset) having the smallest value of the difference from the RGB histogram calculated by the histogram calculating portion 510 (the RGB histogram related to the print image) through the preset selecting portion 160.

The print image (the RGB image) is represented by an image #1 and the image corresponding to the preset (the RGB image) is represented by an image #2. For example, a histogram related to each of the image #1 having a red (R) color and the image #2 having the red (R) color represents a characteristic of an accumulated value of the number of pixels for each tone value in the case in which an axis of abscissa indicates the number of tones in the tone value of 0 to 255 and an axis of ordinate indicates the number of pixels.

Moreover, a histogram related to each of the image #1 having a green (G) color and the image #2 having the green (G) color, and a histogram related to each of the image #1 having a blue (B) color and the image #2 having the blue (B) color also represent a characteristic of an accumulated value of the number of pixels for each tone value in the same manner as described above.

On the precondition, a calculation processing is executed in accordance with the following calculating procedures (1) to (3) so that the value of the difference can be obtained.

(1) Referring to the histogram related to the image #1 having the R color and the histogram related to the image #2 having the R color, the preset selecting portion 160 calculates an absolute value of a difference between the numbers of pixels for each equal tone value in the number of tones and thus obtains a sum of the absolute values (in the example, a sum of 256 absolute values).

(2) The preset selecting portion 160 calculates an absolute value of a difference in the number of pixels for each equal tone value in the number of tones and thus obtains a sum of the absolute values (in the example, a sum of the 256 absolute values) in the same manner as in case of the histogram related to the image having the R color for the histogram related to each of the image having the G color and the image having the B color.

(3) The preset selecting portion 160 totalizes a sum of absolute values related to the image having the R color, a sum of absolute values related to the image having the G color, and a sum of absolute values related to the image having the B color. A result of the totalization (a total value) is equal to a value of a difference between the RGB histogram related to the RGB image #1 and the RGB histogram related to the RGB image #2.

Then, the preset selecting portion 160 obtains a value of a difference between the RGB histogram related to the image #1 and the RGB histogram related to each of the images #2 corresponding to the presets as described above, and extracts one of the obtained difference values which is the smallest.

Furthermore, the preset selecting portion 160 selects any of all the presets which is read by the preset reading portion 150 and includes an image from which the extracted difference value is obtained.

Figure 13A:
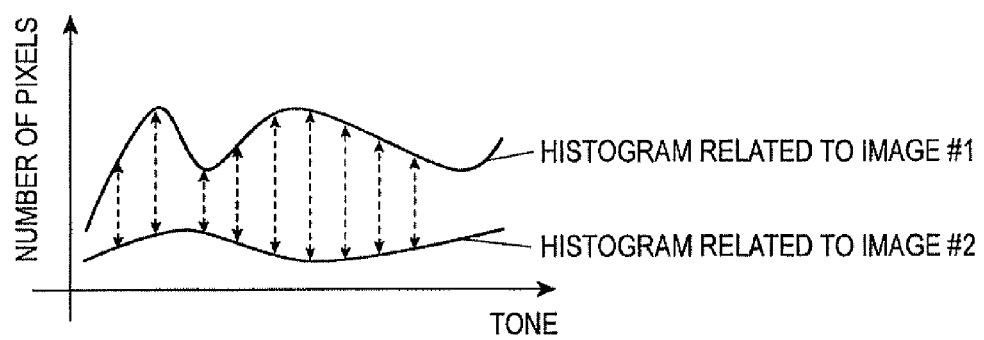
FIG. 13 is a diagram for explaining a difference between two histograms according to the fifth exemplary embodiment.
Figure 13B:
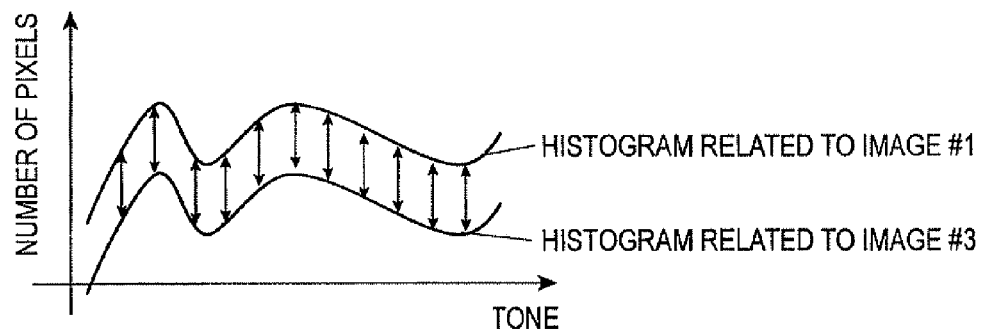

For example, it is assumed that the histogram related to the image #1 having the R color and the histogram related to the image #2 having the R color have contents shown in FIG. 13A and the histogram related to the image #1 having the R color and the histogram related to an image #3 having the R color have contents shown in FIG. 13B.

In this case, if the image having the R color is noted, a value of a difference between the histogram related to the image #1 having the R color and the histogram related to the image #2 having the R color is equal to a sum of differences between tones shown in a dotted line arrow as illustrated in FIG. 13A.

If the image having the R color is noted, moreover, a value of a difference between the histogram related to the image #1 having the R color and the histogram related to the image #3 having the R color is equal to a sum of differences between tones shown in a solid line arrow as illustrated in FIG. 13B.

In the examples shown in FIG. 13, in the case in which the image having the R color is noted, the histogram related to the image #3 has the smallest value of the difference from the histogram related to the image #1.

A hardware structure of the image processing apparatus 50 according to the fifth exemplary embodiment is also the same as that of the image processing apparatus 10 according to the first exemplary embodiment shown in FIG. 4.

An image processing program 12A stored in a storage device 12 includes software (a program) for implementing each of functions of the image input portion 110, the preset image processing portion 120, the image type discriminating portion 130, the preset reading portion 150, the preset selecting portion 160, the preset saving portion 170, the image output portion 180 and the histogram calculating portion 510 in an image processing portion 100 shown in FIG. 11.

Sixth Exemplary Embodiment

Next, an image processing apparatus according a sixth exemplary embodiment will be described.

Figure 14:
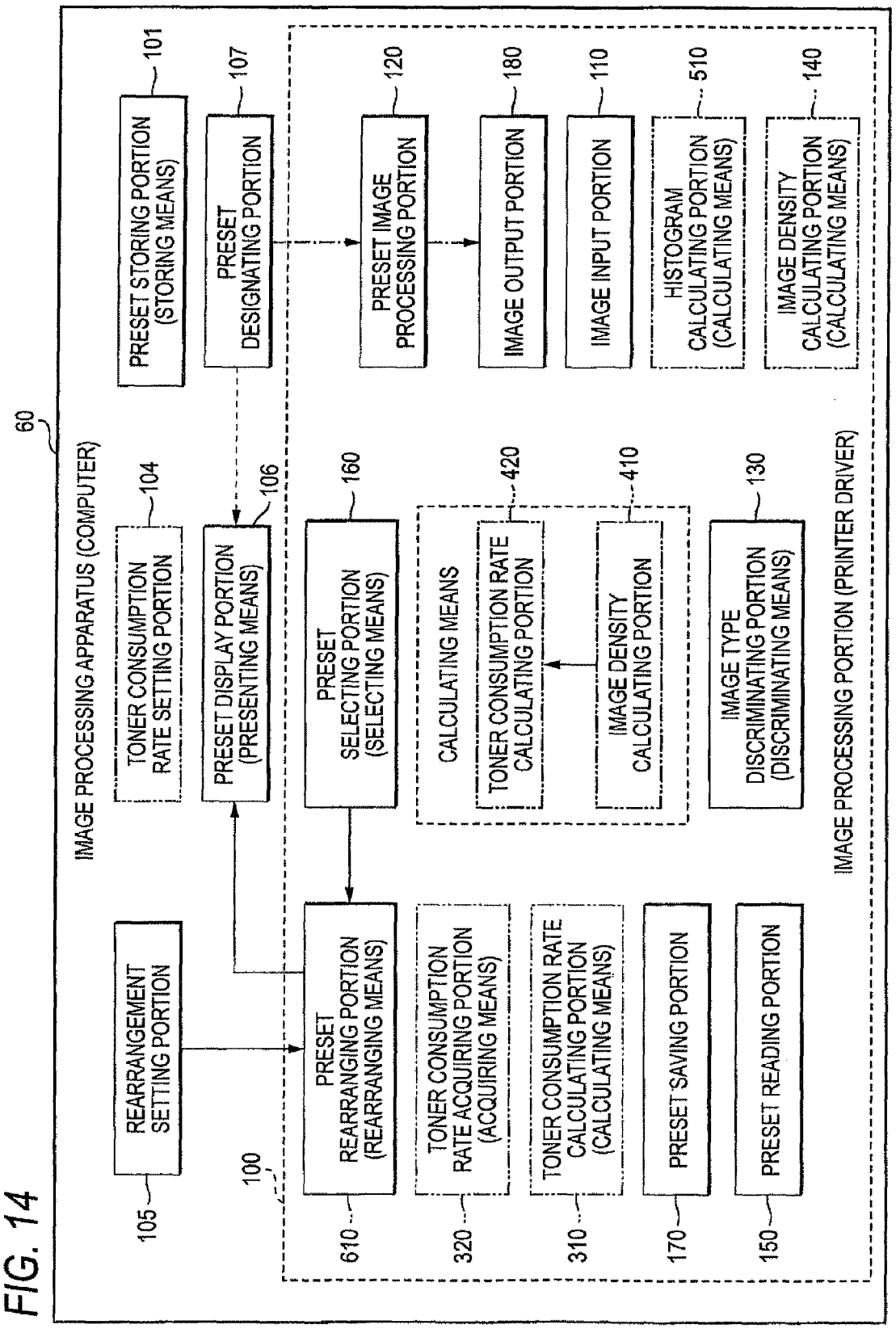
FIG. 14 is a block diagram showing a function of an image processing apparatus according to a sixth exemplary embodiment.

An image processing apparatus 60 according to the sixth exemplary embodiment has a structure shown in FIG. 14. The image processing apparatus 60 has a functional structure in which a rearrangement setting portion 105, a preset display portion 106, a preset designating portion 107, a preset rearranging portion 610, the toner consumption rate calculating portion 310 and the toner consumption rate acquiring portion 320 according to the third exemplary embodiment (see FIG. 6), the image density calculating portion 410 and the toner consumption rate calculating portion 420 according to the fourth exemplary embodiment (see FIG. 9), and the histogram calculating portion 510 according to the fifth exemplary embodiment (see FIG. 11) are additionally provided in the image processing apparatus 10 according to the first exemplary embodiment shown in FIG. 1. In FIG. 14, portions fulfilling the same functions as those of the components shown in FIG. 1 have the same reference numerals. In FIG. 14, moreover, an input portion 102 and a display portion 103 are omitted.

In the sixth exemplary embodiment, an image processing portion 100 has components 110 to 180, 310, 320, 410, 420, 510 and 610 as shown in FIG. 14.

In the sixth exemplary embodiment, furthermore, functions of the preset image processing portion 120, the image density calculating portion 140 and the preset selecting portion 160 are changed as compared with those in the first exemplary embodiment, a function of the toner consumption rate calculating portion 310 is changed as compared with that in the third exemplary embodiment, a function of the toner consumption rate calculating portion 420 is changed as compared with that in the fourth exemplary embodiment, and a function of the histogram calculating portion 510 is changed as compared with that in the fifth exemplary embodiment.

The preset image processing portion 120 executes any of the following processings (1) to (5).

(1) The preset image processing portion 120 generates output plane information (a bit mask) for each of R, G and B colors based on RGB print image data received from the image input portion 110 in the same manner as in the first exemplary embodiment. The output plane information for each of the R, G and B colors is given to the image density calculating portion 140.

(2) The preset image processing portion 120 generates output plane information for each of C, M, Y and K colors from the RGB print image data received from the image input portion 110 in the same manner as in the second exemplary embodiment. The output plane information for each of the C, M, Y and K colors is given to the image density calculating portion 140.

(3) The preset image processing portion 120 carries out nothing over the RGB print image data received from the image input portion 110 in the same manner as in the third exemplary embodiment.

(4) The preset image processing portion 120 generates output plane information for each of the C, M, Y and K colors in the same manner as in the fourth exemplary embodiment. The output plane information for each of the C, M, Y and K colors is given to the image density calculating portion 140.

(5) The preset image processing portion 120 exactly outputs the RUB print image data received from the image input portion 110 to the histogram calculating portion 510 in the same manner as in the fifth exemplary embodiment.

Moreover, the preset image processing portion 120 outputs the print image data received from the image input portion 110 and print setting information included in any of all presets which is read by the preset reading portion 150 and corresponds to a specific preset name designated by the preset designating portion 107 as a print job to the image output portion 180.

The image density calculating portion 140, the toner consumption rate calculating portion 310, the toner consumption rate calculating portion 420 and the histogram calculating portion 510 output a result obtained by the calculation as described above (an RGB image density, a toner consumption rate and an RGB histogram) to the preset rearranging portion 610.

The preset selecting portion 160 has a function of selecting means and selects a plurality of presets including image type information indicative of a type of an image discriminated by the image type discriminating portion 130 from all of the presets read by the preset reading portion 150 (image forming information stored in a preset storing portion 101).

Moreover, the preset selecting portion 160 outputs the presets selected as described above to the preset rearranging portion 610.

The preset rearranging portion 610 has a function of rearranging means, and rearranges the presets selected by the preset selecting portion 160 in accordance with a rearranging reference set by the rearrangement setting portion 105 which will be described below and supplies the presets subjected to the rearrangement to the preset display portion 106.

In other words, the preset rearranging portion 610 carries out any of the following three processings in accordance with the rearranging reference.

In the case in which the rearranging reference is an RGB image density, the preset rearranging portion 610 rearranges a plurality of presets selected by the preset selecting portion 160 in such order as to increase a value of a difference between an index value (an RGB image density) calculated by the image density calculating portion 140 and an index value (an RGB image density) included in the presets.

In the case in which the rearranging reference is an RGB histogram, the preset rearranging portion 610 rearranges a plurality of presets selected by the preset selecting portion 160 in such order as to increase a value of a difference between an index value (an RGB histogram) calculated by the histogram calculating portion 510 and an index value (an RGB histogram) included in the presets.

In the case in which the rearranging reference is a toner consumption rate, the preset rearranging portion 610 rearranges the presets in such order as to increase a value of a difference between a toner consumption rate (a first toner consumption rate) acquired by the toner consumption rate acquiring portion 320 and set by a toner consumption rate setting portion 104 and a toner consumption rate (a second toner consumption rate) calculated by the toner consumption rate calculating portion 310 or the toner consumption rate calculating portion 420.

The rearrangement setting portion 105 sets a reference for rearranging the presets. Examples of the rearranging reference include the RGB image density, the toner consumption rate and the RGB histogram.

The preset display portion 106 has a function of presenting means and displays a plurality of preset names corresponding to a plurality of presets supplied from the preset rearranging portion 610 in rearranging order thereof.

The preset designating portion 107 designates a specific one of the preset names displayed on the preset display portion 106.

The rearrangement setting portion 105 and the preset designating portion 107 are input devices respectively and the preset display portion 106 is a display device, for example.

In the sixth exemplary embodiment, the image density calculating portion 140, the toner consumption rate calculating portion 310, the toner consumption rate acquiring portion 320, the image density calculating portion 410, the toner consumption rate calculating portion 420 and the histogram calculating portion 510 (the components expressed in a square shown in a two-dotted chain line of FIG. 14) in the components constituting the image processing portion 100 function corresponding to the rearranging reference set by the rearrangement setting portion 105.

In other words, only the image density calculating portion 140 functions if the rearranging reference set by the rearrangement setting portion 105 is an RGB image density, only the toner consumption rate calculating portion 310 and the toner consumption rate acquiring portion 320 function if the rearranging reference is a toner consumption rate related to an image corresponding to a preset, only the toner consumption rate acquiring portion 320, the image density calculating portion 410 and the toner consumption rate calculating portion 420 function if the rearranging reference is a toner consumption rate related to a print image, and only the histogram calculating portion 510 functions if the rearranging reference is an RGB histogram.

Figure 15:
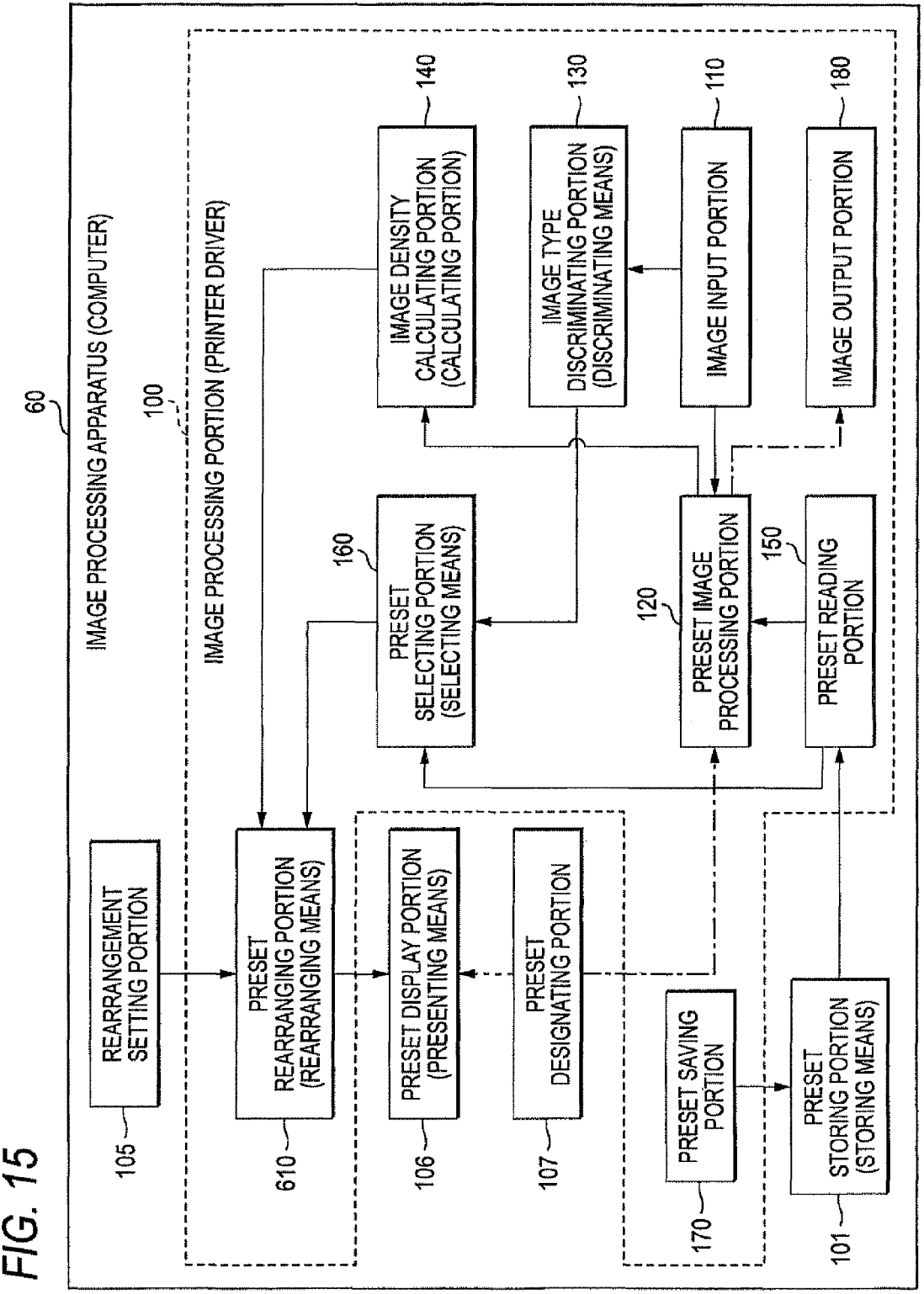
FIG. 15 is a block diagram showing the function of the image processing apparatus in the case in which an RGB image density to be a rearranging reference is set through a rearrangement setting portion according to the sixth exemplary embodiment.

FIG. 15 shows a functional structure of the image processing apparatus 60 in the case in which the RGB image density is set as the rearranging reference by the rearrangement setting portion 105.

Figure 16:
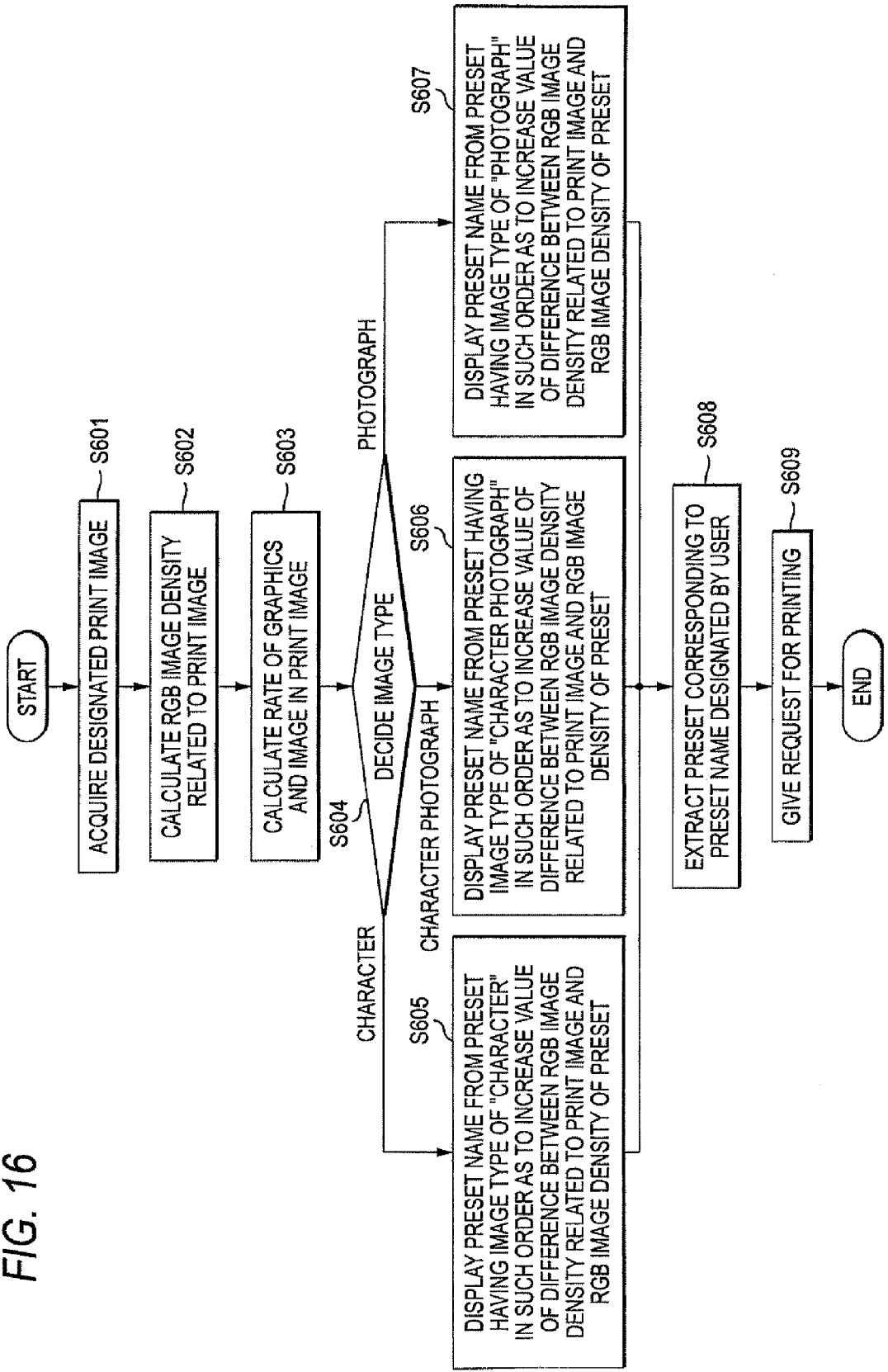
FIG. 16 is a flowchart showing a processing procedure for a preset selection processing in the image processing apparatus according to the sixth exemplary embodiment.

Next, a preset selection processing of the image processing apparatus 60 will be described with reference to FIGS. 15 and 16.

In the example, it is assumed that the preset stored in the preset storing portion 101 includes at least image type information, an RGB image density and print setting information for each image.

It is assumed that a user operates the rearrangement setting portion 105 to set the RGB image density as a rearranging reference.

In this case, only the image density calculating portion 140 functions and the other components have functions stopped in the image density calculating portion 140, the toner consumption rate calculating portion 310, the toner consumption rate acquiring portion 320, the image density calculating portion 410, the toner consumption rate calculating portion 420 and the histogram calculating portion 510 which function corresponding to the rearranging reference set by the rearrangement setting portion 105 in the image processing portion 100 of FIG. 14. In other words, there is brought a state in which the image processing apparatus 60 shown in FIG. 14 is changed into the image processing apparatus 60 shown in FIG. 15.

Figure 3:
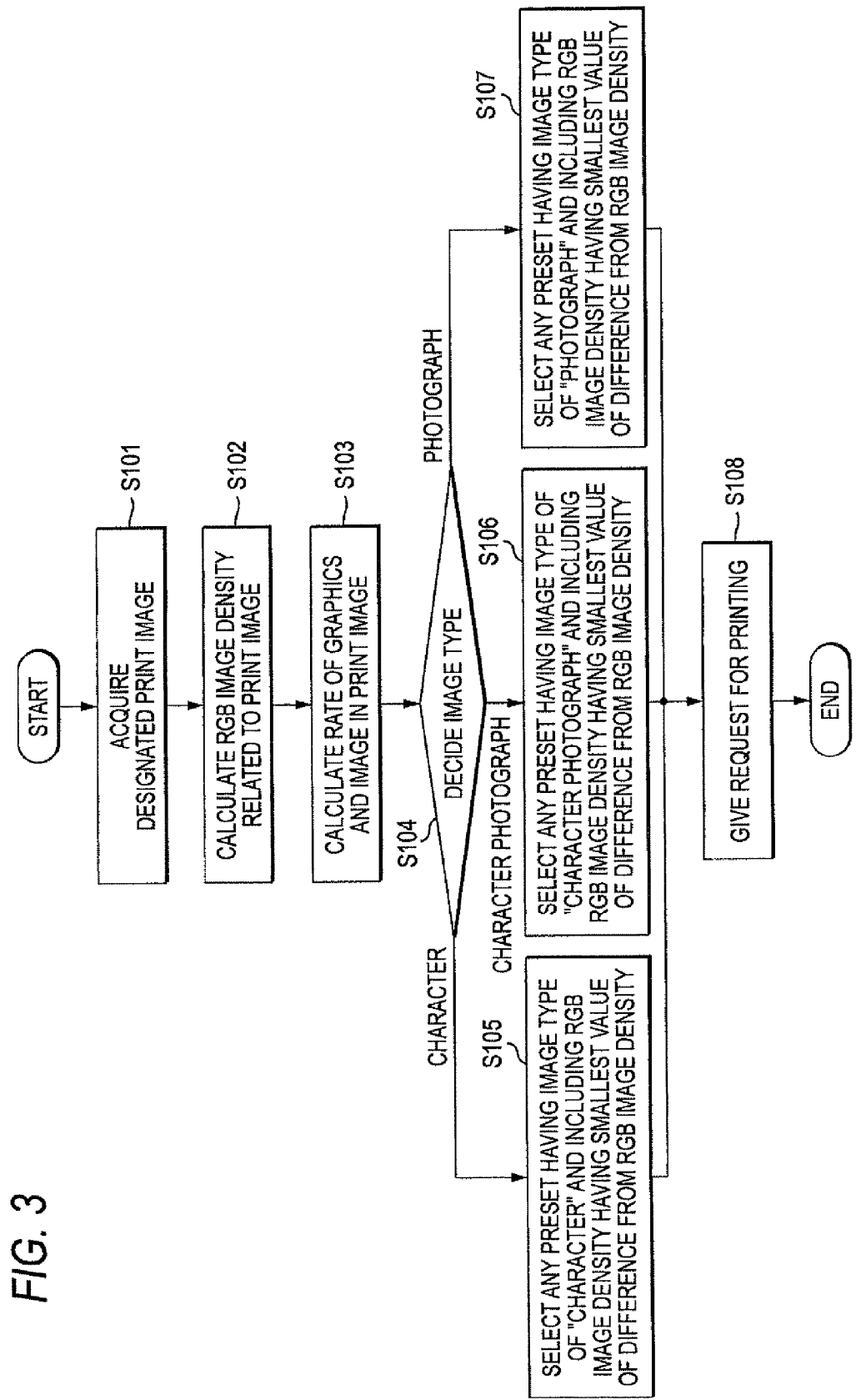
FIG. 3 is a flowchart showing a processing procedure for a preset selection processing in the image processing apparatus according to the first exemplary embodiment.

The image processing apparatus 60 shown in FIG. 15 first executes the same processings as the Steps S101 to S104 of the preset selection processing according to the first exemplary embodiment shown in FIG. 3 (Steps S601 to S604).

The image density calculating portion 140 calculating an RGB image density at the Step S602 outputs the RGB image density thus calculated to the preset rearranging portion 610.

The image type discriminating portion 130 outputs a result (an image identification) obtained by a discrimination at the Step S604 to the preset selecting portion 160.

The preset selecting portion 160 and the preset rearranging portion 610 are cooperated to rearrange a preset including a result of the discrimination obtained from the image type discriminating portion 130 (image type information) in such order as to increase a value of a difference between an RGB image density included in the preset and an RGB image density calculated by the image density calculating portion 140, and the preset display portion 106 displays preset names corresponding to the presets subjected to the rearrangement in arranging order thereof (Steps S605 to S607).

In other words, if the image type transferred from the image type discriminating portion 130 is a "character" at the Step S605, the preset selecting portion 160 selects a plurality of presets having image type information indicative of the "character" from all of the presets read by the preset reading portion 150 and outputs the presets thus selected to the preset rearranging portion 610.

The preset rearranging portion 610 rearranges the presets transferred from the preset selecting portion 160 in such order as to increase a value of a difference between the RGB image density included in the presets and the RGB image density calculated by the image density calculating portion 140.

Moreover, the preset rearranging portion 610 supplies the presets subjected to the rearrangement to the preset display portion 106.

The preset display portion 106 displays preset names corresponding to the presets supplied from the preset rearranging portion 610 in arranging order thereof.

If the image type transferred from the image type discriminating portion 130 is a "character photograph" at the Step S606, moreover, the preset selecting portion 160 selects a plurality of presets having image type information indicative of the "character photograph" from all of the presets read by the preset reading portion 150 and outputs the presets thus selected to the preset rearranging portion 610.

The preset rearranging portion 610 rearranges the presets transferred from the preset selecting portion 160 in such order as to increase a value of a difference between the RGB image density included in the presets and the RGB image density calculated by the image density calculating portion 140.

Moreover, the preset rearranging portion 610 supplies the presets subjected to the rearrangement to the preset display portion 106.

The preset display portion 106 displays preset names corresponding to the presets supplied from the preset rearranging portion 610 in arranging order thereof.

If the image type transferred from the image type discriminating portion 130 is a "photograph" at the Step S607, furthermore, the preset selecting portion 160 selects a plurality of presets having image type information indicative of the "photograph" from all of the presets read by the preset reading portion 150 and outputs the presets thus selected to the preset rearranging portion 610.

The preset rearranging portion 610 rearranges the presets transferred from the preset selecting portion 160 in such order as to increase a value of a difference between the RGB image density included in the presets and the RGB image density calculated by the image density calculating portion 140.

Moreover, the preset rearranging portion 610 supplies the presets subjected to the rearrangement to the preset display portion 106.

The preset display portion 106 displays preset names corresponding to the presets supplied from the preset rearranging portion 610 in arranging order thereof.

Then, the user operates the preset designating portion 107 to select a specific one of the preset names which are displayed on the preset display portion 106 at the Step S605, S606 or S607 and are arranged in such order as to increase the value of the difference.

The specific preset name thus selected is given to the preset image processing portion 120.

The preset image processing portion 120 extracts any of all the presets which is read by the preset reading portion 150 and corresponds to the specific preset name designated by the preset designating portion 107 (Step S608) and outputs print setting information included in the extracted preset and print image data received from the image input portion 110 as a print job to the image output portion 180.

The image output portion 180 outputs the print job transferred from the preset image processing portion 120 toward a printer which is not shown, thereby giving a request for printing (Step S609).

Figure 17:
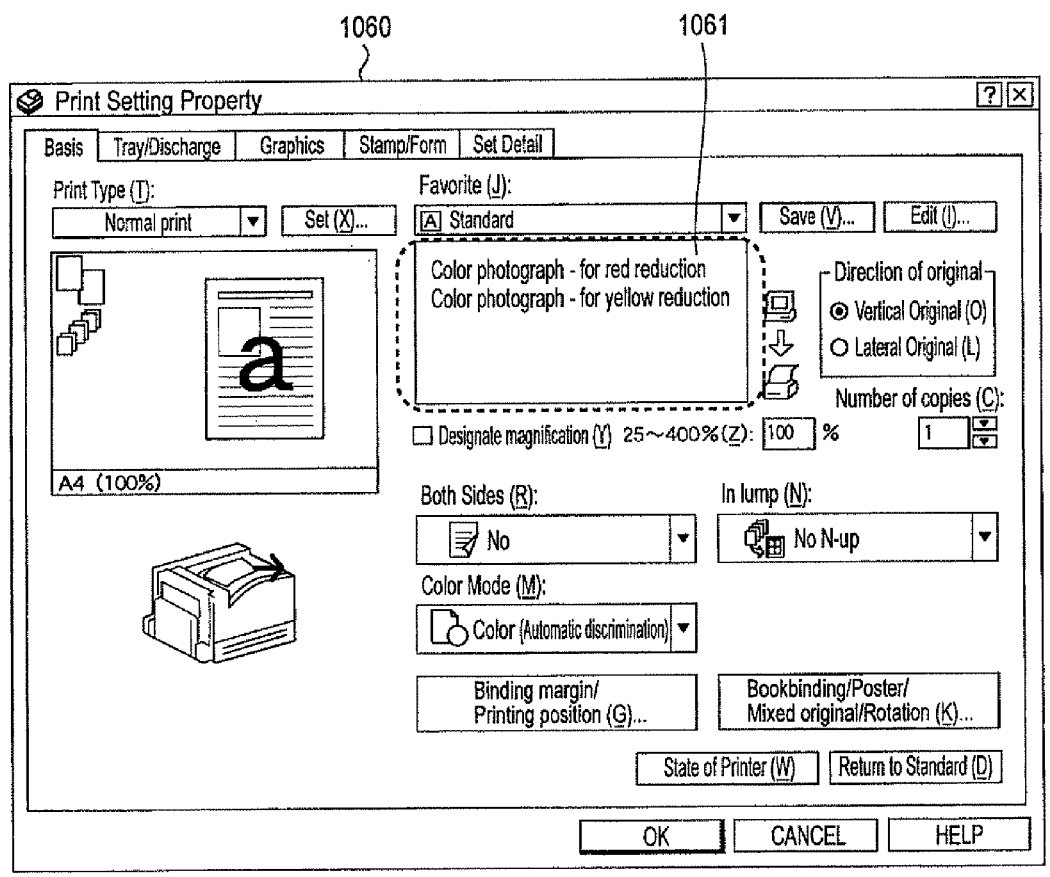
FIG. 17 is a view showing an example of a plurality of preset names to be displayed in a print setting property displayed on a preset display portion of the image processing apparatus according to the sixth exemplary embodiment (in case of no rearrangement)

The following assumption is given. If the preset selecting portion 160 extracts a plurality of presets which is read by the preset reading portion 150 and includes the result of the discrimination obtained from the image type discriminating portion 130 (the image type information) corresponding to an yellow photographic image as a print image, the presets thus extracted are displayed on the preset display portion 106 via the preset rearranging portion 610 without an execution of the rearrangement. FIG. 17 shows an example of the display in this case.

In the example shown in FIG. 17, a preset name of "standard", a preset name of "color photograph—for red reduction" and a preset name of "color photograph—for yellow reduction" are displayed as preset names corresponding to the presets including the image type information of "photograph" in order from top in a preset name display column 1061 of a print setting property 1060 offered from the image processing portion 100 serving as a printer driver. For example, the preset is displayed in order of storage in the preset storing portion 101 or in alphabetical order for the preset name.

Figure 18:
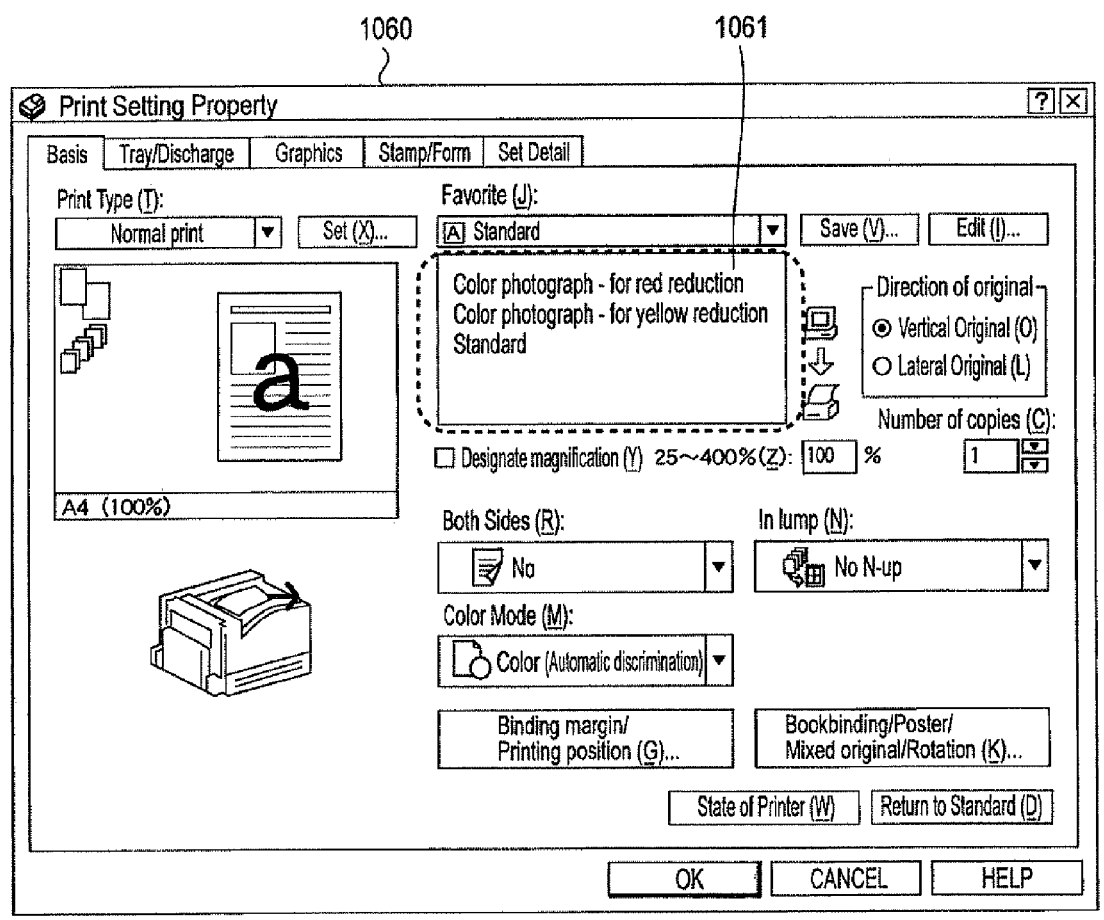
FIG. 18 is a view showing an example of a plurality of preset names to be displayed in the print setting property displayed on the preset display portion of the image processing apparatus according to the sixth exemplary embodiment (in case of the rearrangement)

On the other hand, it is assumed that the preset selecting portion 160 extracts presets corresponding to the preset names displayed in the preset name display column 1061 in FIG. 17 as the presets which are read by the preset reading portion 150 and include the result of the discrimination obtained from the image type discriminating portion 130 (the image type information of "photograph"). FIG. 18 shows a condition in which the preset names corresponding to the presets thus extracted are rearranged by the preset rearranging portion 610 and are then displayed on the preset display portion 106.

In an example shown in FIG. 18, a preset name of "color photograph—for yellow reduction", a preset name of "color photograph—for red reduction" and a preset name of "standard" are displayed as preset names corresponding to the presets including the image type information of "photograph" in order from top in the preset name display column 1061 of the print setting property 1060. In other words, the preset name of "color photograph—for yellow reduction" is displayed in higher order of arrangement.

A hardware structure of the image processing apparatus 60 according to the sixth exemplary embodiment is also the same as that of the image processing apparatus 10 according to the first exemplary embodiment shown in FIG. 4.

Seventh Exemplary Embodiment

Next, an image processing apparatus according to a seventh exemplary embodiment will be described.

Figure 19:
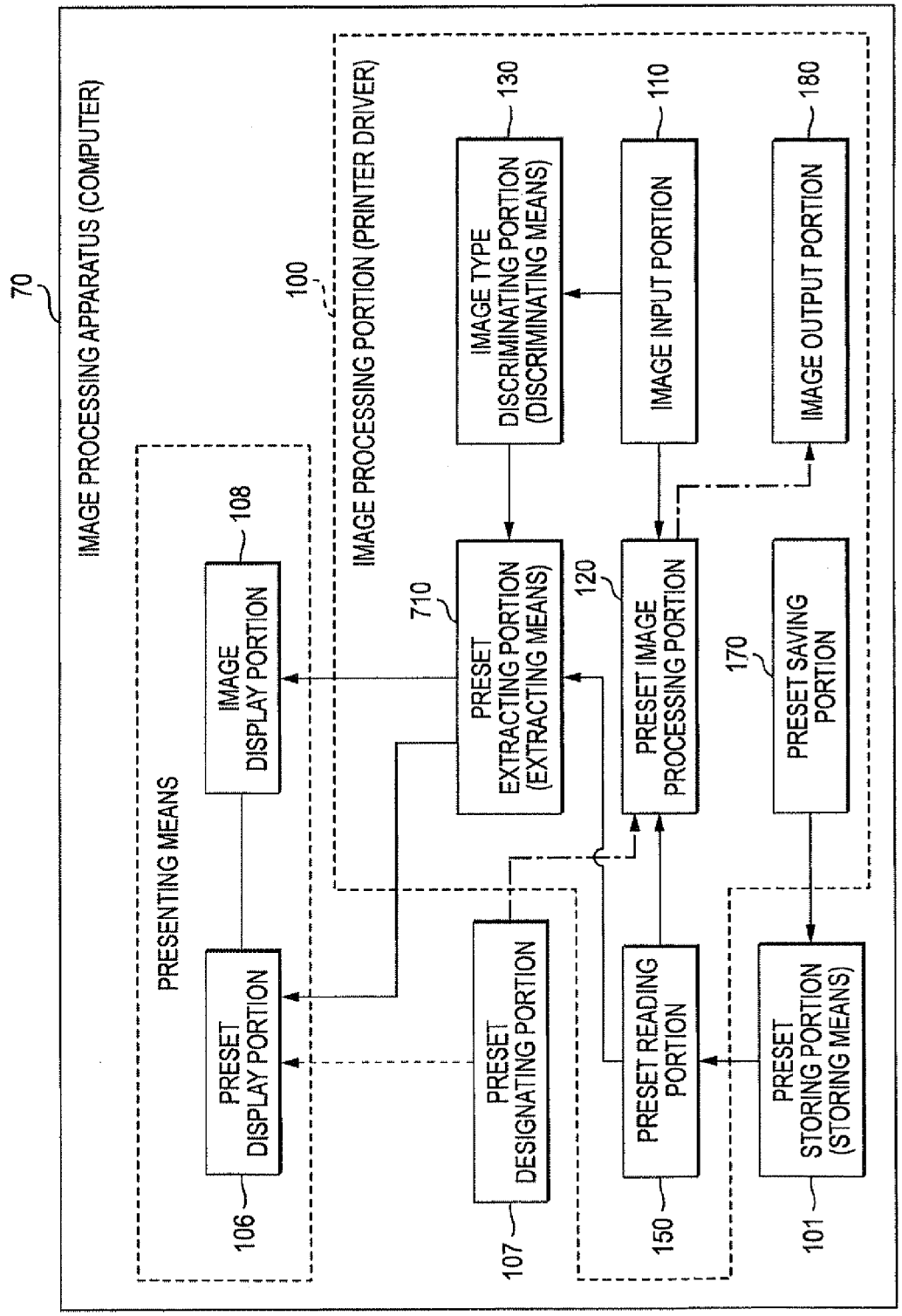
FIG. 19 is a block diagram showing a function of an image processing apparatus according to a seventh exemplary embodiment.

An image processing apparatus 70 according to the seventh exemplary embodiment has a structure shown in FIG. 19. The image processing apparatus 70 has a functional structure in which the image density calculating portion 140 and the preset selecting portion 160 are deleted, and a preset extracting portion 710, an image display portion 108 and the preset display portion 106 and a preset designating portion 107 according to the sixth exemplary embodiment are additionally provided in the image processing apparatus 10 according to the first exemplary embodiment shown in FIG. 1. In FIG. 19, portions fulfilling the same functions as those of the components shown in FIG. 1 have the same reference numerals. In FIG. 19, moreover, an input portion 102 and a display portion 103 are omitted.

In the seventh exemplary embodiment, functions of a preset storing portion 101, a preset image processing portion 120 and an image type discriminating portion 130 are changed as compared with those in the first exemplary embodiment.

The preset storing portion 101 stores a preset including image type information, a reduced image to be a decision source related to a suppression in a consumption of a recording material (an image for presentation), print setting information and a preset name for each image.

The preset image processing portion 120 acquires a preset corresponding to a specific preset name designated by the preset designating portion 107 from the presets read by a preset reading portion 150, and furthermore, outputs print image data received from an image input portion 110 and print setting information included in the acquired preset as a print job to an image output portion 180.

The image type discriminating portion 130 has a function of discriminating means, and discriminates a type of a print image and outputs a result of the discrimination (image type information) to the preset extracting portion 710.

The preset extracting portion 710 has a function of extracting means, and extracts any of the presets which is read by the preset reading portion 150 (the presets stored in the preset storing portion 101) and includes the image type information indicative of the type of the image discriminated by the image type discriminating portion 130. A preset name corresponding to the preset thus extracted is displayed on the preset display portion 106.

The image display portion 108 displays a reduced image (an image for presentation) included in the preset extracted by the preset extracting portion 710 in response to a preset name corresponding to the same preset.

In the seventh exemplary embodiment, the preset display portion 106 and the image display portion 108 fulfill a function of presenting means.

Figure 20:
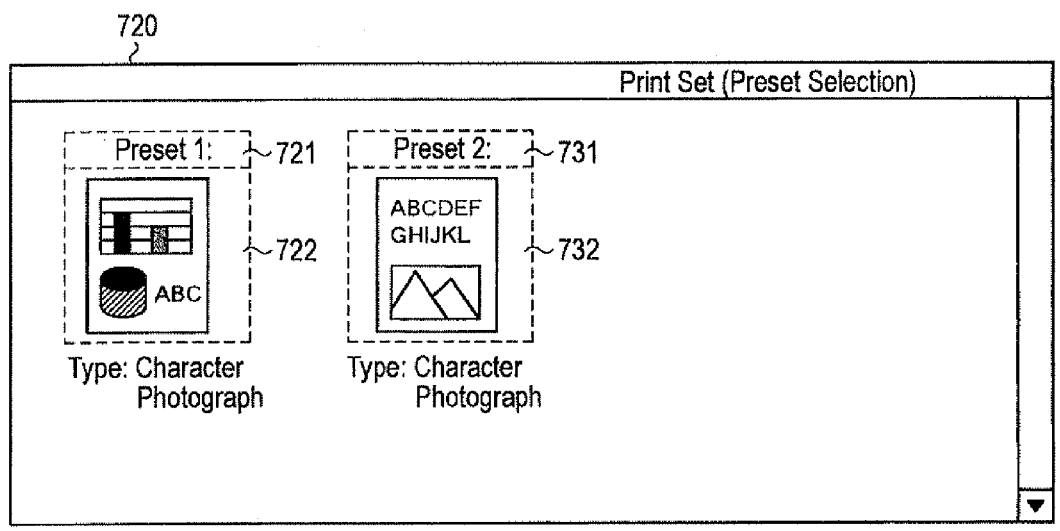
FIG. 20 is a diagram showing an example of a display of a preset name to be displayed on a preset display portion and a reduced image to be displayed on an image display portion in the image processing apparatus according to the seventh exemplary embodiment.

FIG. 20 shows a condition in which the preset name is displayed on the preset display portion 106 and the reduced image is displayed on the image display portion 108.

In an example shown in FIG. 20, display regions 721 and 731 and display regions 722 and 732 in a print setting property (a driver property) 720 displayed on the display portion 103 correspond to the preset display portion 106 and the image display portion 108, respectively.

In the example, if an image type of a print image is a "character photograph", a preset name (preset 1) corresponding to a preset including the same image type as the "character photograph" is displayed on the display region 721 (the preset display portion 106) and a reduced image is displayed corresponding to the preset name (preset 1) on the display region 722 (the image display portion 108).

Similarly, a preset name (preset 2) corresponding to a preset including the same image type as the "character photograph") is displayed on the display region 731 (the preset display portion 106) and a reduced image is displayed corresponding to the preset name (preset 2) on the display region 732 (the image display portion 108).

Figure 21:
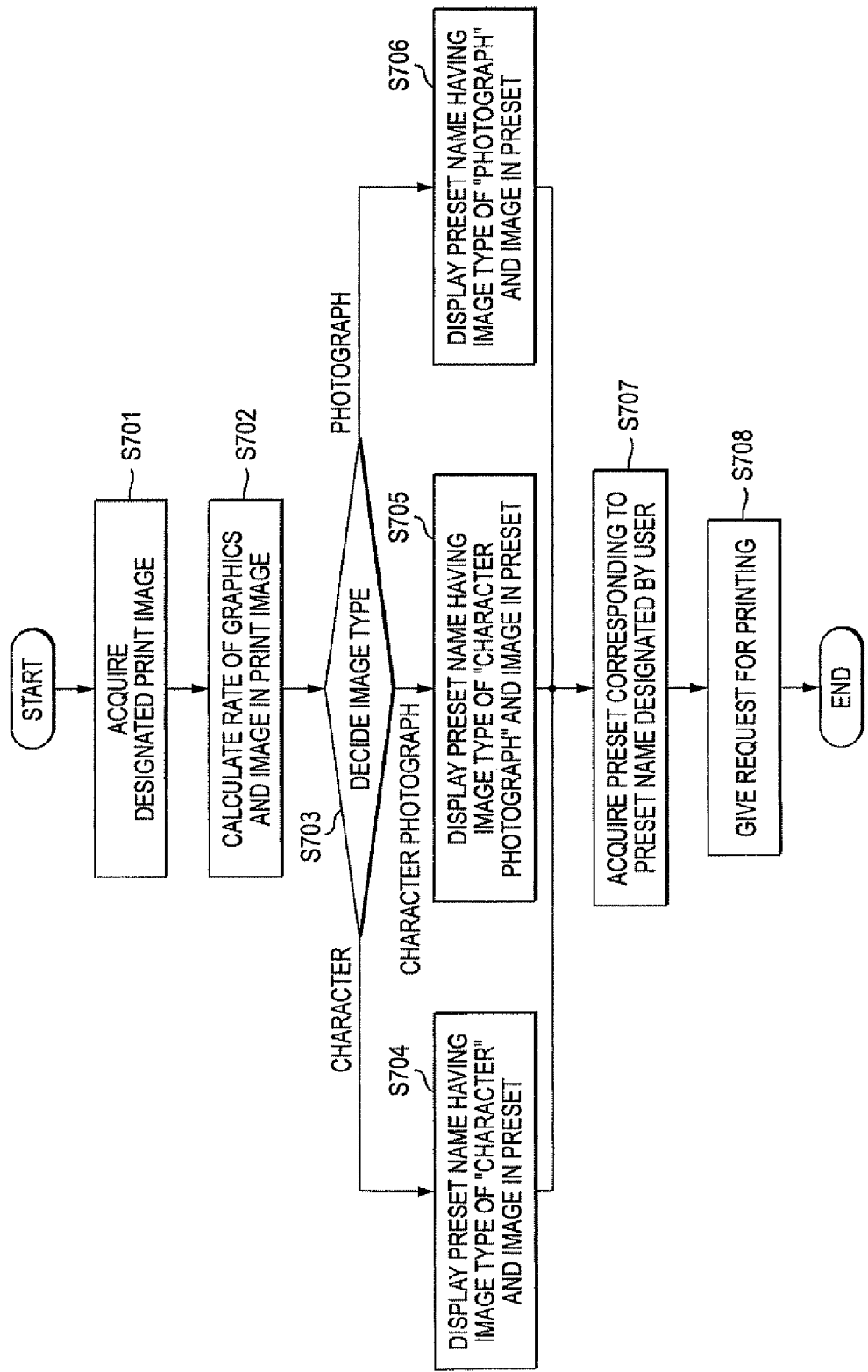
FIG. 21 is a flowchart showing a processing procedure for a preset selection processing in the image processing apparatus according to the seventh exemplary embodiment.

Next, a preset selection processing of the image processing apparatus 70 will be described with reference to FIG. 21.

A user operates the input portion 102 in a state in which an application that is being operated and started by the image processing apparatus 70 is displayed on the display portion 103, and gives a print command from the application and presses down a "property" button in a print dialog offered by the application and displayed on the display portion 103.

When the "property" button in the print dialog is thus pressed down, an image processing portion 100 serving as a printer driver is started.

In the image processing portion 100 thus started, the preset reading portion 150 reads all of the presets from the preset storing portion 101.

Moreover, the image input portion 110 reads print image data from the application (Step S701) and outputs the print image data thus read to the preset image processing portion 120 and the image type discriminating portion 130.

The image type discriminating portion 130 calculates a rate of graphics and an image in a print image based on the received print image data (Step S702) and discriminates an image type of the print image based on a result of the calculation (Step S703), and outputs a result of the discrimination to the preset extracting portion 710.

The preset extracting portion 710 receiving the result of the discrimination obtained from the image type discriminating portion 130 (the image type) extracts any of all the presets which is read by the preset reading portion 150 and includes image type information indicative of the image type discriminated by the image type discriminating portion 130.

Next, the preset extracting portion 710 displays a preset name of the extracted preset on the preset display portion 106, and furthermore, displays a reduced image corresponding to the extracted preset on the image display portion 108 (Steps S704 to S706).

More specifically, if the image type transferred from the image type discriminating portion 130 is a "character", the preset extracting portion 710 extracts any of all the presets which is read by the preset reading portion 150 and has image type information indicative of the "character", and displays a preset name of the extracted preset on the preset display portion 106 and displays a reduced image corresponding to the extracted preset on the image display portion 108 (Step S704).

If the image type transferred from the image type discriminating portion 130 is a "character photograph", moreover, the preset extracting portion 710 extracts any of all the presets which is read by the preset reading portion 150 and has image type information indicative of the "character photograph", and displays a preset name of the extracted preset on the preset display portion 106 and displays a reduced image corresponding to the extracted preset on the image display portion 108 (Step S705).

If the image type transferred from the image type discriminating portion 130 is a "photograph", furthermore, the preset extracting portion 710 extracts any of all the presets which is read by the preset reading portion 150 and has image type information indicative of the "photograph", and displays a preset name of the extracted preset on the preset display portion 106 and displays a reduced image corresponding to the extracted preset on the image display portion 108 (Step S706).

The user selects a specific preset name by referring to the preset name displayed on the preset display portion 106 and the reduced image displayed on the image display portion 108 corresponding to the preset name.

The specific preset name thus selected is given to the preset image processing portion 120. Therefore, the preset image processing portion 120 acquires any of all the presets which is read by the preset reading portion 150 and corresponds to the specific preset name (Step S707), and furthermore, outputs the print image data which have already been received from the image input portion 110 and the print setting information in the acquired preset as a print job to the image output portion 180.

The image output portion 180 outputs the print job from the preset image processing portion 120 toward a printer which is not shown, thereby giving a request for executing printing (Step S708).

A hardware structure of the image processing apparatus 70 according to the seventh exemplary embodiment is also the same as that of the image processing apparatus 10 according to the first exemplary embodiment shown in FIG. 4.

Eighth Exemplary Embodiment

Next, an image processing apparatus according to an eighth exemplary embodiment will be described.

Figure 22:
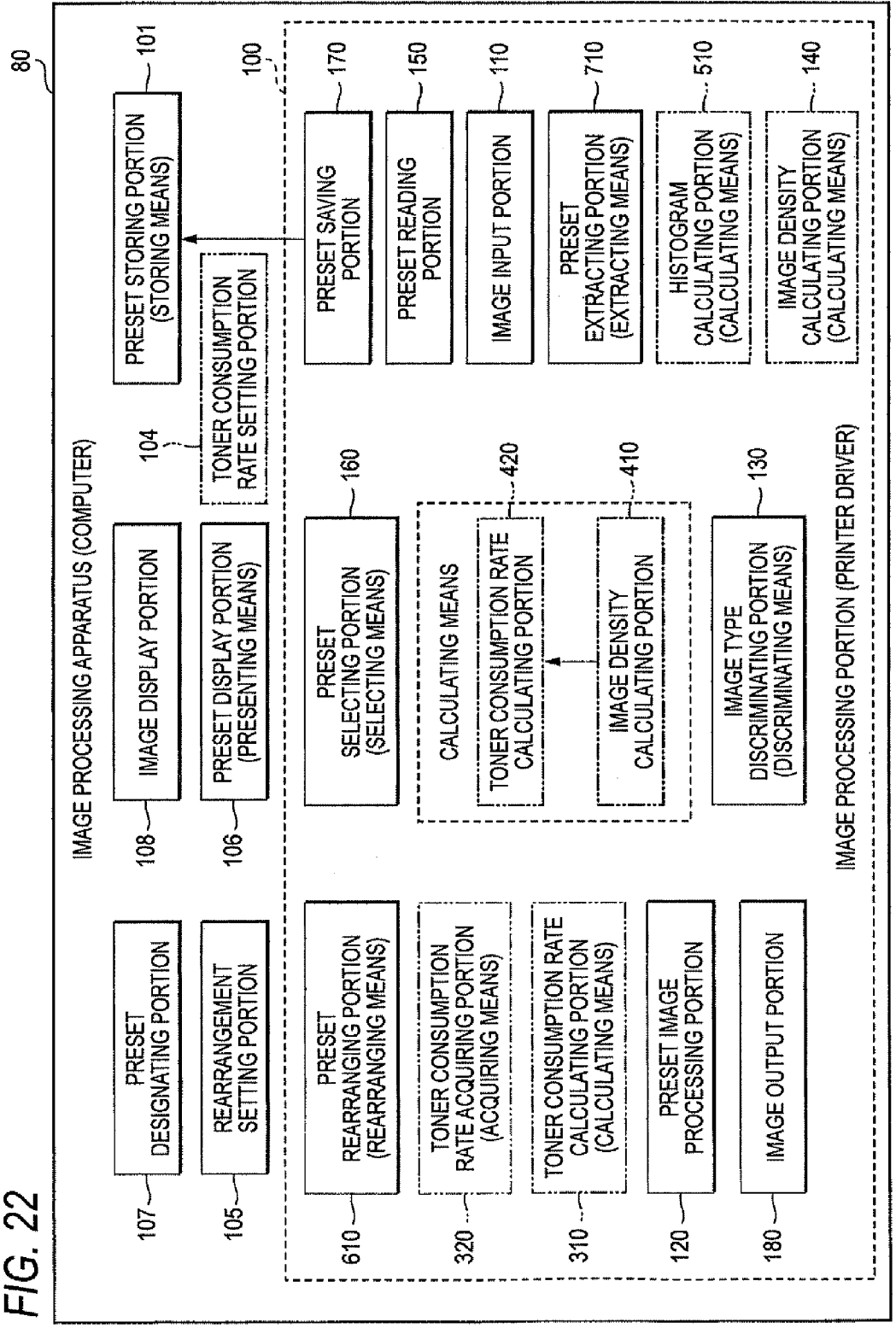
FIG. 22 is a block diagram showing a function of an image processing apparatus according to an eighth exemplary embodiment.

An image processing apparatus 80 according to the eighth exemplary embodiment has a structure shown in FIG. 22. The image processing apparatus 80 has a structure in which the image display portion 108 and the preset extracting portion 710 according to the seventh exemplary embodiment are additionally provided in the image processing apparatus 60 according to the sixth exemplary embodiment shown in FIG. 14. In FIG. 22, portions fulfilling the same functions as those of the components shown in FIG. 14 have the same reference numerals. In FIG. 22, moreover, an input portion 102 and a display portion 103 are omitted.

In the case in which a user designates a selection of a preset in accordance with an index for any of an RGB image density, an RGB histogram, a toner consumption rate and a reduced image, the image processing apparatus 80 fulfills the function of the image processing apparatus according to any of the first to seventh exemplary embodiments in response to the designating index.

In the eighth exemplary embodiment, an image processing portion 100 has components 110 to 180, 310, 320, 410, 420, 510, 610 and 710 as shown in FIG. 22.

A preset storing portion 101 stores a plurality of presets having the data structure shown in FIG. 2.

Figure 23:
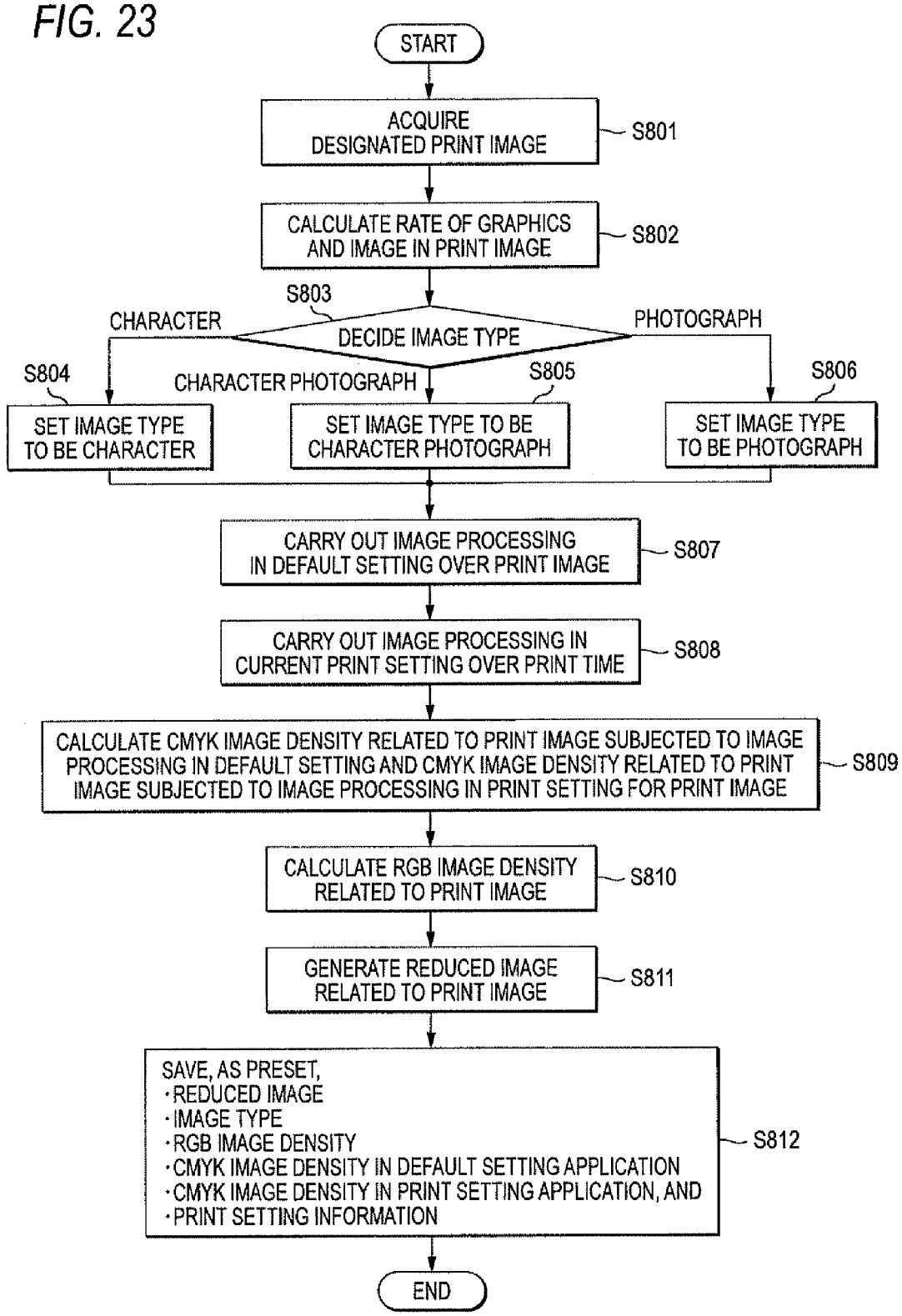
FIG. 23 is a flowchart showing a processing procedure for a preset save processing in the image processing apparatus according to the eighth exemplary embodiment.

In the eighth exemplary embodiment, description will be given to a preset save processing. In other words, the preset save processing of the image processing apparatus 80 will be described with reference to FIG. 23.

A user operates the input portion 102 (which is not shown in FIG. 22) in a state in which an application that is being operated and started by the image processing apparatus 80 is displayed on the display portion 103 (which is not shown in FIG. 22), and gives a print command from the application and presses down a "property" button in a print dialog offered by the application and displayed on the display portion 103.

When the "property button" in the print dialog is thus pressed down, the image processing portion 100 serving as a printer driver is started and a print property (a driver property) is displayed on the display portion 103 by the image processing portion 100 which is started. The user operates the input portion 102 to press down a "save" button in the print property displayed on the display portion 103.

When the "save" button in the print property is thus pressed down by the user, the preset reading portion 150 in the image processing portion 100 reads default print setting information from the preset storing portion 101. In this case, a preset in the preset storing portion 101 is not read.

Moreover, the image input portion 110 reads print image data (RGB print image data) from the application (Step S801) and outputs the print image data thus read to the preset image processing portion 120 and the image type discriminating portion 130.

The image type discriminating portion 130 calculates a rate of graphics and an image in a print image based on the received print image data (Step S802) and discriminates an image type of the print image based on a result of the calculation (Step S803), and outputs a result of the discrimination to the preset image processing portion 120.

The preset image processing portion 120 recognizes that an image type of the print image is a character if a result of the discrimination which is received is image type information indicative of the character (Step S804), recognizes that the image type of the print image is a character photograph if the result is image type information indicative of the character photograph (Step S805), and furthermore, recognizes that the image type of the print image is a photograph if the result is image type information indicative of the photograph (Step S806).

The preset image processing portion 120 generates a print image in a default setting application (a CMYK print image) from the RGB print image data received from the image input portion 110 and generates output plane information for each of C, M, Y and K colors corresponding to the print image in the default setting application (Step S807), and furthermore, outputs the output plane information for each of the C, M, Y and K colors thus generated to the image density calculating portion 410.

Moreover, the preset image processing portion 120 generates a print image in a print setting application which is adapted to print setting information related to the print image (a CMYK print image) from the RGB print image data received from the image input portion 110 and generates output plane information for each of the C, M, Y and K colors corresponding to the print image in the print setting application (Step S808), and furthermore, outputs the output plane information for each of the C, M, Y and K colors thus generated to the image density calculating portion 410.

The image density calculating portion 410 calculates a CMYK image density based on the output plane information for each of the C, M, Y and K colors corresponding to the print image in the default setting application which is received from the preset image processing portion 120, and calculates a CMYK image density based on the output plane information for each of the C, M, Y and K colors corresponding to the print image in the print setting application which is received from the preset image processing portion 120 (Step S809).

Moreover, the preset image processing portion 120 generating the output plane information for each of the C, M, Y and K colors as described above generates output plane information for each of R, G and B colors based on the RGB print image data received from the image input portion 110, and outputs the output plane information for each of the R, G and B colors to the image density calculating portion 140.

The image density calculating portion 140 calculates an RGB image density based on the output plane information for each of the R, G and B colors received from the preset image processing portion 120 (Step S810).

The preset image processing portion 120 generating the output plane information for each of the R, G and B colors as described above carries out a reduction processing in a predetermined reducing magnification over the RGB print image data transferred from the image input portion 110, thereby generating a reduced image (Step S811).

Finally, the preset saving portion 170 saves, as a preset related to a print image at this time in the preset storing portion 101, the reduced image related to the print image generated at the Step S811, the image type information indicative of the image type recognized at any of the Steps S804 to S806, the RGB image density (RGB accumulated value) related to the print image calculated at the Step S810, the CMYK image density (CMYK accumulated value) related to the print image in the default setting application (the output plane information for each of the C, M, Y and K colors) and the CMYK image density (CMYK accumulated value) related to the print image in the print setting application (the output plane information for each of the C, M, Y and K colors) which are calculated at the Step S809, and the print setting information related to the print image read at the Step S801 (Step S812).

Although the specific description has been given based on the exemplary embodiments according to the invention made by the inventor, it is to be considered that the exemplary embodiments disclosed in the specification are illustrative in all respects and the invention is not restricted to the disclosed techniques. In other words, the technical range of the invention should not be construed to be restrictive based on the description of the exemplary embodiments but should be persistently construed in accordance with the description of the claims, and all changes are included without departing from equivalent techniques to the technique described in the claims and the gist of the claims.

In the case in which a program is used, moreover, it is also possible to offer the program through a network or to store the program in a storage medium such as a CD-ROM so as to be offered.

In other words, it is also possible to offer a program including an image processing program in the following manner in addition to the case in which the program is recorded in a storage device such as a hard disk.

For example, it is also possible to store the program in an ROM and to cause a CPU to load the program from the ROM onto a main storage device, thereby executing the program.

Moreover, the program may be stored in a computer readable storage medium such as a DVD-ROM, a CD-ROM, an MO (a magneto-optical disk) or a flexible disk so as to be distributed.

Furthermore, it is also possible to connect an image processing apparatus to a server device or a host computer through a communication line (for example, Internet), and to download the program from the server device or the host computer and to then execute the program. In this case, examples of a downloading destination for the program include a memory such as an RAM and a storage device (a storage medium) such as a hard disk.

The image processing apparatus according to the invention may be applied to an image processing apparatus for transmitting print data toward an image forming apparatus for forming an image with a toner (an image forming apparatus of an electrophotographic process type) or an image forming apparatus for forming an image with an ink (an image forming apparatus of an ink jet type).

What is claimed is:

1. An image processing apparatus comprising:
    a storing unit that stores an image forming information including an image type information indicative of a type of an image for each image, an index value to be a decision source related to a suppression in a consumption of a recording material, and a print setting information;
    a discriminating unit that discriminates a type of an image to be an image forming target;
    a calculating unit that calculates the index value; and
    a selecting unit that selects any of the image forming information which is stored in the storing unit and takes top priority based on a result of the discrimination obtained by the discriminating unit and a result of the calculation obtained by the calculating unit.

2. The image processing apparatus according to claim 1, wherein the storing unit stores, as the index value, an image density related to an image for each color of a color space which is calculated,
    the calculating unit calculates an image density which is the index value and is related to an image for each color of a color space concerned with the image to be the image forming target, and
    the selecting unit selects any of the image forming information which is stored in the storing unit, includes image type information indicative of the type of the image discriminated by the discriminating unit, and includes an image density having the smallest value of a difference from the image density calculated by the calculating unit.

3. The image processing apparatus according to claim 1 further comprising:
    an acquiring unit that acquires a first consumption rate of a recording material which is designated by a user, wherein
    the calculating unit calculates a second consumption rate of the recording material which is the index value and is related to an image corresponding to any of the image forming information that is stored in the storing unit and includes the image type information indicative of the type of the image discriminated by the discriminating unit based on the image forming information in response to the image forming information, and
    the selecting unit obtains a difference between the first consumption rate and the second consumption rate and selects any of the image forming information which includes the image type information indicative of the type of the image discriminated by the discriminating unit and corresponds to the second consumption rate of the recording material that has the smallest value of the difference.

4. The image processing apparatus according to claim 1 further comprising:
    an acquiring unit that acquires a first consumption rate of a recording material which is designated by a user, wherein
    the calculating unit calculates a second consumption rate of the recording material which is the index value and is related to the image to be the image forming target based on any of the image forming information which is stored in the storing unit and includes the image type information indicative of the type of the image discriminated by the discriminating unit and the image to be the image forming target in response to the image forming information, and
    the selecting unit obtains a difference between the first consumption rate and the second consumption rate and selects any of the image forming information which includes the image type information indicative of the type of the image discriminated by the discriminating unit and corresponds to the second consumption rate of the recording material that has the smallest value of the difference.

5. The image processing apparatus according to claim 1, wherein the storing unit stores, as the index value, a histogram related to an image for each color of a color space which is calculated,
    the calculating unit calculates a histogram which is the index value and is related to an image for each color of a color space concerned with the image to be the image forming target, and
    the selecting unit selects any of the image forming information which is stored in the storing unit, includes image type information indicative of the type of the image discriminated by the discriminating unit, and includes a histogram having the smallest value of a difference from the histogram calculated by the calculating unit.

6. The image processing apparatus according to claim 2 further comprising:
    a rearranging unit that rearranges a plurality of image forming information which is stored in the storing unit and includes the image type information indicative of the type of the image discriminated by the discriminating unit, and is selected by the selecting unit in such order as to increase the value of the difference between the two index values when the selecting unit selects the image forming information; and
    a presenting unit that presents, to the user, the image forming information in order of the rearrangement through the rearranging unit.

7. An image processing apparatus comprising:
    a storing unit that correspondingly stores an image forming information including an image type information indicative of a type of an image for each image, an image for presentation which is related to a pertinent image to be a decision source concerned with a suppression in a consumption of a recording material and a print setting information, and a name given to the image forming information;
    a discriminating unit that discriminates a type of an image to be an image forming target;
    an extracting unit that extracts any of the image forming information which is stored in the storing unit and includes image type information indicative of the type of the image discriminated by the discriminating unit; and a presenting unit that presents, to a user, a name corresponding to the image forming information extracted by the extracting unit and an image for presentation which is included in the image forming information.

8. A non-transitory computer readable medium storing a program causing a computer to execute an image processing, the process comprising:

storing, in a storing unit, an image forming information including an image type information indicative of a type of an image for each image, an index value to be a decision source related to a suppression in a consumption of a recording material and a print setting information;

discriminating a type of an image to be an image forming target;

calculating the index value; and selecting any of the image forming information which is stored in the storing unit and takes top priority based on a result of the discrimination obtained at the discriminating and a result of the calculation obtained at the calculating.

9. A non-transitory computer readable medium storing a program causing a computer to execute an image processing, the process comprising:

correspondingly storing, in a storing unit, an image forming information including an image type information indicative of a type of an image for each image, an image for presentation which is related to a pertinent image to be a decision source concerned with a suppression in a consumption of a recording material and a print setting information, and a name given to the image forming information;

discriminating a type of an image to be an image forming target;

extracting any of the image forming information which is stored in the storing unit and includes an image type information indicative of the type of the image discriminated at the discriminating; and presenting a name corresponding to the image forming information extracted at the extracting and an image for presentation which is included in the image forming information.

* * * * *